US011372538B2

(12) United States Patent
Yamano et al.

(10) Patent No.: US 11,372,538 B2
(45) Date of Patent: Jun. 28, 2022

(54) DETECTION DEVICE AND DETECTION METHOD

(71) Applicant: SONY CORPORATION, Tokyo (JP)

(72) Inventors: Ikuo Yamano, Tokyo (JP); Hiroyuki Mizunuma, Tokyo (JP); Eisuke Nomura, Tokyo (JP); Akihiro Komori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 42 days.

(21) Appl. No.: 16/733,995

(22) Filed: Jan. 3, 2020

(65) Prior Publication Data

US 2020/0142584 A1    May 7, 2020

Related U.S. Application Data

(63) Continuation of application No. 14/406,847, filed as application No. PCT/JP2013/066026 on Jun. 11, 2013, now Pat. No. 10,558,352.

(30) Foreign Application Priority Data

Jun. 22, 2012 (JP) ................................. 2012-141489

(51) Int. Cl.
*G06F 3/04855* (2022.01)
*G06F 3/04883* (2022.01)
(Continued)

(52) U.S. Cl.
CPC .......... *G06F 3/04883* (2013.01); *G06F 3/044* (2013.01); *G06F 3/0485* (2013.01);
(Continued)

(58) Field of Classification Search
CPC .. G06F 3/04883; G06F 3/04855; G06F 3/044; G06F 3/0485; G06F 2203/04105; H04N 21/42224; H04N 21/42204
See application file for complete search history.

(56) References Cited

U.S. PATENT DOCUMENTS 6,765,557 B1    7/2004  Segal et al.
2007/0236476 A1  10/2007  Suzuki
(Continued)

FOREIGN PATENT DOCUMENTS

AU    2010226120 A    11/2011
AU    2011349513 A1    5/2013
(Continued)

OTHER PUBLICATIONS

Non-Final Office Action for U.S. Appl. No. 14/406,847, dated Aug. 11, 2016, 14 pages.
(Continued)

*Primary Examiner* — Amit Chatly
(74) *Attorney, Agent, or Firm* — Chip Law Group

(57) ABSTRACT

There is provided a detection device that detects a user operation, the detection device including an acquisition unit that acquires a start position indicating a position on an operation surface at which contact with the operation surface is started, the operation surface having user operation areas overlapped and arranged thereon, the user operation areas being a target of a user operation and detected according to the user operation, the user operation areas having at least one of an operation content and an operation target of the user operation different therein, and a decision unit that decides an operation corresponding to a user operation area that is the target of the user operation among the plurality of user operation areas which are overlapped and arranged, on the basis of the start position. The operation surface is provided on a part different from a display screen that displays content.

12 Claims, 13 Drawing Sheets

(51) Int. Cl.
*G06F 3/044* (2006.01)
*H04N 21/422* (2011.01)
*G06F 3/0485* (2022.01)

(52) U.S. Cl.
CPC ... *G06F 3/04855* (2013.01); *H04N 21/42204* (2013.01); *H04N 21/42224* (2013.01); *G06F 2203/04105* (2013.01)

(56) References Cited

U.S. PATENT DOCUMENTS

| | | |
|---|---|---|
| 2008/0284741 A1 | 11/2008 | Hsu et al. |
| 2009/0231145 A1 | 9/2009 | Wada et al. |
| 2010/0085314 A1 | 4/2010 | Kwok |
| 2010/0088632 A1 | 4/2010 | Knowles et al. |
| 2010/0214234 A1* | 8/2010 | Singhal ............... G06F 3/04883 345/173 |
| 2010/0235118 A1 | 9/2010 | Moore et al. |
| 2010/0333011 A1 | 12/2010 | Kornev et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0205018 A1 | 8/2011 | Oohashi et al. |
| 2011/0206239 A1 | 8/2011 | Wada et al. |
| 2011/0310047 A1 | 12/2011 | Moore et al. |
| 2012/0089940 A1 | 4/2012 | Jang et al. |
| 2012/0327018 A1* | 12/2012 | Oshita .................. G06F 3/0418 345/174 |
| 2013/0016039 A1 | 1/2013 | Moore et al. |
| 2014/0375586 A1 | 12/2014 | De et al. |

FOREIGN PATENT DOCUMENTS

| | | |
|---|---|---|
| CA | 2755443 A1 | 9/2010 |
| CA | 2817648 A1 | 9/2010 |
| CA | 2817890 A1 | 9/2010 |
| CN | 102422264 A | 4/2012 |
| CN | 102768608 A | 11/2012 |
| DE | 112010001143 T5 | 5/2012 |
| EP | 2409222 A2 | 1/2012 |
| EP | 2413237 A1 | 2/2012 |
| JP | 11-339684 A | 12/1999 |
| JP | 2007-122793 A | 5/2007 |
| JP | 2007-280019 A | 10/2007 |
| JP | 2009-151691 A | 7/2009 |
| JP | 2009-237746 A | 10/2009 |
| JP | 2012-521050 A | 9/2012 |
| KR | 10-2011-0130484 A | 12/2011 |
| NL | 2007993 A | 6/2012 |
| TW | 201237735 A | 9/2012 |
| WO | 2010/107669 A2 | 9/2010 |
| WO | 2010/107669 A3 | 11/2010 |
| WO | 2012/087939 A1 | 6/2012 |

OTHER PUBLICATIONS

Non-Final Office Action for U.S. Appl. No. 14/406,847, dated Oct. 19, 2017, 16 pages.
Non-Final Office Action for U.S. Appl. No. 14/406,847, dated Nov. 16, 2018, 16 pages.
Final Office Action for U.S. Appl. No. 14/406,847, dated Mar. 9, 2017, 15 pages.
Final Office Action for U.S. Appl. No. 14/406,847, dated May 31, 2018, 14 pages.
Final Office Action for U.S. Appl. No. 14/406,847, dated May 24, 2019, 13 pages.
Advisory Action for U.S. Appl. No. 14/406,847, dated Jun. 9, 2017, 03 pages.
Advisory Action for U.S. Appl. No. 14/406,847, dated Aug. 3, 2018, 03 pages.
Advisory Action for U.S. Appl. No. 14/406,847, dated Aug. 2, 2019, 03 pages.
Notice of Allowance for U.S. Appl. No. 14/406,847, dated Sep. 30, 2019, 11 pages.
International Search Report and Written Opinion of PCT Application No. PCT/JP2013/066026, dated Aug. 13, 2013, 08 pages of English Translation and 08 pages of ISRWO.
International Preliminary Report on Patentability of PCT Application No. PCT/JP2013/066026, dated Dec. 31, 2014, 07 pages of English Translation and 04 pages of IPRP.

* cited by examiner

DETECTION DEVICE AND DETECTION METHOD

CROSS-REFERENCE TO RELATED APPLICATIONS

The present application is a continuation application of U.S. patent application Ser. No. 14/406,847 filed on Dec. 10, 2014 which is a National Stage Entry of PCT/JP2013/066026, filed Jun. 11, 2013, and claims the benefit of priority from prior Japanese Patent Application JP 2012-141489, filed Jun. 22, 2012, the entire content of which is hereby incorporated by reference.

TECHNICAL FIELD

The present disclosure relates to a detection device, a detection method, and a program, and in particular, relates to a detection device, a detection method, and a program for improving operability of a user operation accompanied by contact or pressure, for instance.

BACKGROUND ART

Conventionally, for instance, in a remote controller of a television receiver, a channel and a volume (sound volume) of the television receiver are controlled in response to detection of depression of a channel button and a volume button or the like.

However, in recent years, by introduction of a television receiver capable of displaying a web browser or the like in addition to broadcast programs, a remote controller capable of detecting a user operation accompanied by contact or pressure by a finger of a user or the like to an operation surface has been introduced.

This remote controller can output different command according to different user operations to the same operation surface (for instance, see Patent Literature 1).

That is, for instance, on the operation surface, a pointer operation area to be operated when moving a pointer on a web browser displayed in a television received image and a volume button area to be operated when changing the sound volume of the television receiver are overlapped and arranged.

Therefore, for instance, a user can move the pointer by performing a contact moving operation of moving a finger of the user or the like in a contact state on the pointer operation area within the operation surface.

Also, for instance, the user can make a decision to select a link destination of a uniform resource locator (URL) or the like indicated by the pointer by performing a pressing operation of pressing the pointer operation area within the operation surface. Thus, the user can change display of the web browser to the display of the selected link destination.

Further, for instance, the user can change the sound volume of the television receiver by performing a pressing operation of pressing the volume button area within the operation surface.

CITATION LIST

Patent Literature

Patent Literature 1:
JP 2009-151691A

SUMMARY OF INVENTION

Technical Problem

Now, on the operation surface, the pointer operation area and the volume button area are overlapped and arranged as described above.

Therefore, for instance, when the user performs the pressing operation on an overlap area where the pointer operation area and the volume button area are overlapped and arranged, the sound volume of the television receiver may be changed against an intention of the user.

That is, for instance, sometimes the sound volume of the television receiver is changed even though the user performs the pressing operation of pressing the overlap area with the intention of making a decision to select the link destination of the URL or the like indicated by the pointer, and operability of a user operation to the operation surface is poor.

The present disclosure is implemented in consideration of such circumstances and is to improve the operability of the user operation accompanied by contact and pressure.

Solution to Problem

According to one aspect of the present disclosure, there is provided a detection device that detects a user operation, the detection device including an acquisition unit that acquires a start position indicating a position on an operation surface at which contact with the operation surface is started, the operation surface having user operation areas overlapped and arranged thereon, the user operation areas being a target of a user operation and detected according to the user operation, the user operation areas having at least one of an operation content and an operation target of the user operation different therein, and a decision unit that decides an operation corresponding to a user operation area that is the target of the user operation among the plurality of user operation areas which are overlapped and arranged, on the basis of the start position. The operation surface is provided on a part different from a display screen that displays content.

The acquisition unit can acquire the start position on the operation surface at which new contact targeting the operation surface is started in response to a start of the new contact.

The detection device can further include a time measurement unit that measures required time needed from an end of the contact with the operation surface to the start of the new contact with the operation surface. The decision unit can decide the operation corresponding to the user operation area that is the target of the user operation on the basis of the required time as well.

The decision unit can decide the operation corresponding to the user operation area that is the target of the user operation on the basis of a state of the content on the display screen as well.

The decision unit can decide the operation corresponding to the target user operation area for which the content is the operation target regardless of the start position while the content is being reproduced. The decision unit can decide the operation corresponding to the user operation area that is the target of the user operation on the basis of the start position while the content is not being reproduced.

The decision unit can select the target user operation area on the basis of presence or absence of visual recognition of the operation surface by a user as well.

The decision unit can decides the operation corresponding to the user operation area that is the target of the user operation on the basis of the start position when the user visually recognizes the operation surface. The decision unit can decide the operation corresponding to the target user operation area defined beforehand regardless of the start position when the user does not visually recognize the operation surface.

The detection device can further include a determination unit that determines whether or not the user visually recognizes the operation surface, on the basis of a captured image obtained from an imaging unit that images the user.

The decision unit can decide the operation corresponding to the target user operation area for which the content is the operation target regardless of the start position in response to the pressing operation for reproducing the content on the display screen.

The detection device can further include a detection unit that detects at least one of contact with or pressure on the operation surface. The acquisition unit acquires the start position by calculating the start position on the basis of a detection result of the detection unit.

The acquisition unit can acquire the start position by receiving the start position transmitted from an operation input device that detects the start position according to the user operation.

According to one aspect of the present disclosure, there is provided a detection method of a detection device that detects a user operation, the detection method including, by the detection device, an acquisition step of acquiring a start position indicating a position on an operation surface at which contact with the operation surface is started, the operation surface having user operation areas overlapped and arranged thereon, the user operation areas being a target of a user operation and detected according to the user operation, the user operation areas having at least one of an operation content and an operation target of the user operation different therein, and a decision step of deciding an operation corresponding to a user operation area that is the target of the user operation among the plurality of user operation areas which are overlapped and arranged, on the basis of the start position. The operation surface is provided on a part different from a display screen that displays content.

According to one aspect of the present disclosure, there is provided a program for causing a computer to function as an acquisition unit that acquires a start position indicating a position on an operation surface at which contact with the operation surface is started, the operation surface having user operation areas overlapped and arranged thereon, the user operation areas being a target of a user operation and detected according to the user operation, the user operation areas having at least one of an operation content and an operation target of the user operation different therein, and a decision unit that decides an operation corresponding to a user operation area that is the target of the user operation among the plurality of user operation areas which are overlapped and arranged, on the basis of the start position. The operation surface is provided on a part different from a display screen that displays content.

According to one aspect of the present disclosure, a start position indicating a position on an operation surface, where user operation areas which are a target of a user operation and detected according to the user operation and in which at least one of an operation content and an operation target of the user operation is different are overlapped and arranged, when contact with the operation surface is started is acquired, and an operation corresponding to the user operation area that is the target of the user operation among the plurality of user operation areas that are overlapped and arranged is decided on the basis of the start position. Also, the operation surface is provided on a part different from a display screen that displays content.

Advantageous Effects of Invention

According to the present disclosure, the operability of the user operation accompanied by contact and pressure can be improved.

DESCRIPTION OF EMBODIMENTS

Hereinafter, embodiments in the present disclosure (called embodiments, hereinafter) will be described. Descriptions will be given in the following order.

1. First embodiment (one example of the time of selecting a user operation area that is a target of a user operation, on the basis of a position with which a finger of a user or the like is brought into contact first)

2. Second embodiment (one example of the time of fixing coordinates of a pointer or the like for some time when a pressing operation by the user is performed)

3. Modification

1. First Embodiment

[Appearance Example of Remote Controller 21]

Figure 1:
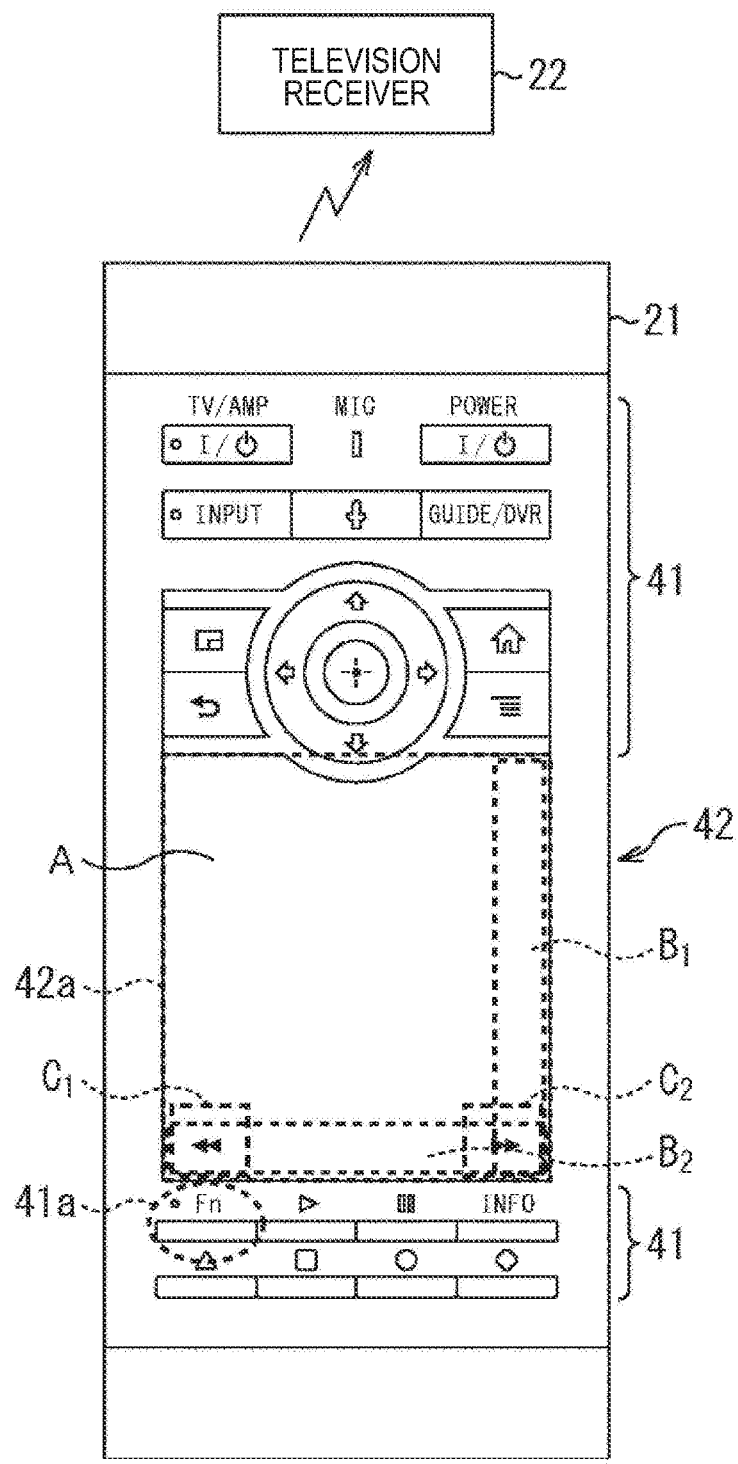
FIG. 1 is a diagram illustrating an appearance example of a remote controller to which the present technology is applied.

FIG. 1 illustrates an appearance example of a remote controller 21. On a surface of the remote controller 21, together with operation buttons 41, an operation surface 42a of a touch pad 42 forming a part of the remote controller 21 is provided.

Therefore, a user can perform an operation for turning on a power source of a television receiver 22 or the like using the operation buttons 41 and the operation surface 42a. The touch pad 42 will be described in detail with reference to FIG. 2.

The operation buttons 41 are constituted of a drag button 41a or the like in addition to a power button, a reproduction button, a stop button and the like, and operated by the user.

The drag button 41a is a function key capable of allocating another function to a button having a predetermined function.

That is, for instance, when the user depresses the power button having a function of turning on or off the power source of the television receiver 21 in the state of depressing the drag button 41a, the power button is to function as another button like the reproduction button or the like for instance.

Also, the user can perform a first drag operation of moving his/her own finger on the operation surface 42a in the state of pressing the operation surface 42a with his/her own finger or the like.

In addition, for instance, the user can perform a second drag operation of moving his/her own finger on the operation surface 42a in the state of depressing the drag button 41a.

The first drag operation and the second drag operation are both performed in the case of moving an operation target displayed on a display screen of the television receiver 22 or in the case of selecting a prescribed area on the display screen of the television receiver 22 or the like.

In the case of performing the first drag operation, since only the operation surface 42a should be operated, the user can perform the first drag operation with one hand without using both hands, for instance.

Also, in the case that the user performs the second drag operation using the drag button 41a, even when the finger or the like is released from the operation surface 42a, the situation of canceling the second drag operation can be prevented as long as it is the state of depressing the drag button 41a.

Therefore, when the finger or the like is brought into contact with the operation surface 42a again, the user can continue the second drag operation.

The operation surface 42a is provided with, as user operation areas to be the target of the user operation indicating an operation to be performed by the user, a pointer operation area A, an edge scroll area $B_1$, an edge scroll area $B_2$, an FR button area $C_1$, and an FF button area $C_2$.

Here, as kinds (operation contents) of the user operation, there exists, in addition to the above-described drag operation, a contact moving operation, a pressing operation and the like.

The contact moving operation is an operation of moving the finger of the user or the like in a direction in which the user wants to move a pointer or the like as an operation target, for instance, in the state of bringing his/her own finger or the like into contact with the operation surface 42a. The pointer is displayed on the display screen of the television receiver 22.

Also, the pressing operation is an operation that the user presses a position on the operation surface 42a using his/her own finger or the like.

As the pressing operation, for instance, there exist two kinds that are a click operation of pressing the position on the operation surface 42a while the finger of the user or the like is kept in contact with the operation surface 42a, and a tap operation of pressing the position on the operation surface 42a as if tapping (lightly hitting) it in the state that the finger of the user or the like is not in contact with the operation surface 42a.

The pointer operation area A is provided on the entire surface of the operation surface 42a as illustrated in FIG. 1, and is the target of the contact moving operation and the pressing operation.

That is, for instance, the pointer operation area A is the target of the contact moving operation when the pointer or the like displayed on the display screen of the television receiver 22 is the operation target and the pointer or the like as the operation target is to be moved.

Also, for instance, the pointer operation area A is the target of the pressing operation when the link destination of a uniform resource locator (URL) or the like existing at the position indicated by the pointer or the like is the operation target and the link destination as the operation target is to be specified.

In the pointer operation area A, in a vertically long partial area that is present on the right side in the figure and extends in a vertical direction (longitudinal direction) in the figure, the edge scroll area $B_1$ is overlapped and provided.

The edge scroll area $B_1$ is the target of the contact moving operation when a scroll bar for scrolling the display screen of the television receiver 22 in the vertical direction is the operation target and the scroll bar is to be moved.

Also, in the edge scroll area $B_1$, a lower end portion of the edge scroll area $B_1$ is the target of the pressing operation when content displayed on the display screen of the television receiver 22 is the operation target and the content as operation target are to be fast-forwarded.

The lower end portion of the edge scroll area $B_1$ indicates the same part as the part provided with the FF button area $C_2$.

Further, in the pointer operation area A, in a horizontally long partial area that is present on the lower side in the figure and extends in a horizontal direction (lateral direction) in the figure, the edge scroll area $B_2$ is overlapped and provided.

The edge scroll area $B_2$ is the target of the contact moving operation when a scroll bar for scrolling the display screen of the television receiver 22 in the horizontal direction is the operation target and the scroll bar is to be moved.

Also, in the edge scroll area $B_2$, a lower left portion of the edge scroll area $B_2$ is the target of the pressing operation when content displayed on the display screen of the television receiver 22 is the operation target and the content as the operation target are to be rewound.

A left end portion of the edge scroll area $B_2$ indicates the same part as the part provided with the FR button area $C_1$.

Further, in the edge scroll area $B_2$, a lower right portion of the edge scroll area $B_2$ is the target of the pressing operation when content displayed on the display screen of the television receiver 22 is the operation target and the content as the operation target are to be fast-forwarded.

The lower right portion of the edge scroll area $B_2$ indicates the same part as the part provided with the FF button area $C_2$.

The FR button area $C_1$ is the target of the pressing operation when the content displayed on the display screen of the television receiver 22 is the operation target and the content as the operation target are to be rewound.

The FF button area $C_2$ is the target of the pressing operation when the content displayed on the display screen of the television receiver 22 is the operation target and the content as the operation target are to be fast-forwarded.

Also, the FR button area $C_1$ and the FF button area $C_2$ use the content as the operation target, and form a button area C that is the target of the pressing operation when the content is rewound and fast-forwarded as the operation target.

That is, on the operation surface 42a, as the user operation areas for which the operation target is different though the operation content of the user operation is the same, the pointer operation area A and the edge scroll areas $B_1$ and $B_2$ are overlapped and arranged.

Also, on the operation surface 42a, as the user operation areas for which the operation content and the operation target are both different, the pointer operation area A and the button area C are overlapped and arranged, and also the edge scroll areas $B_1$ and $B_2$ and the button area C are overlapped and arranged.

As described above, in the pointer area A, for instance, the pointer and the link destination and the like are the operation target, and the contact moving operation and the pressing operation are adopted as the operation content of the user operation.

Also, in the edge scroll areas $B_1$ and $B_2$, for instance, the scroll bar and the content are the operation target, and the contact moving operation and the pressing operation are adopted as the operation content of the user operation.

Further, in the button area C, for instance, the content is the operation target, and the pressing operation is adopted as the operation content of the user operation.

Hereinafter, the pointer operation area A, the edge scroll areas $B_1$ and $B_2$, and the button area C are also called user operation areas A, $B_1$, $B_2$ and C, respectively.

The remote controller 21 calculates a start position on the operation surface 42a on the basis of a detection result of at least one of contact of a user finger with or the like or pressure of a user finger or the like on the operation surface 42a, for instance. Also, the contact with or the pressure on the operation surface 42a are detected by the touch pad 42.

Also, the start position indicates a position on the operation surface 42a when the contact with the operation surface 42a is started.

That is, for instance, the remote controller 21 calculates a centroid of a contact surface where the finger of the user or the like and the operation surface 42a are brought into contact or the like as the start position, on the basis of the detection result of the contact of the user finger or the like with the operation surface 42a.

Also, for instance, the remote controller 21 can also calculate a position where a pressure by the finger of the user or the like is the largest as the start position, on the basis of the detection result of the pressure of the user finger or the like on the operation surface 42a.

Further, for instance, the remote controller 21 may calculate the start position on the basis of the detection result of the contact and the pressure by the user finger or the like. In the first embodiment, it is assumed that the remote controller 21 calculates the start position on the basis of the detection result of the contact and the pressure by the user finger or the like.

Also, the remote controller 21 selects a target user operation area indicating the user operation area that is the target of the user operation from the plurality of user operation areas A, $B_1$, $B_2$ and C on the operation surface 42a, on the basis of the calculated start position on the operation surface 42a.

Further, the remote controller 21 detects the operation content of the user operation and the operation target of the user operation, on the basis of the detection result of the contact with and the pressure on the target user operation area on the operation surface 42a.

Then, the remote controller 21 controls the television receiver 22, on the basis of the detection result.

That is, for instance, the remote controller 21 generates IR signals for controlling the television receiver 22, and emits the IR signals to the television receiver 22 as radio signals, on the basis of the detection result of the operation content of the user operation and the operation target of the user operation.

The television receiver 22 receives the IR signals from the remote controller 21, and performs processing of moving the pointer or the like that is the operation target according to the operation content of the user operation, for instance, on the basis of the received IR signals.

[Detail of Touch Pad 42]

Figure 2:
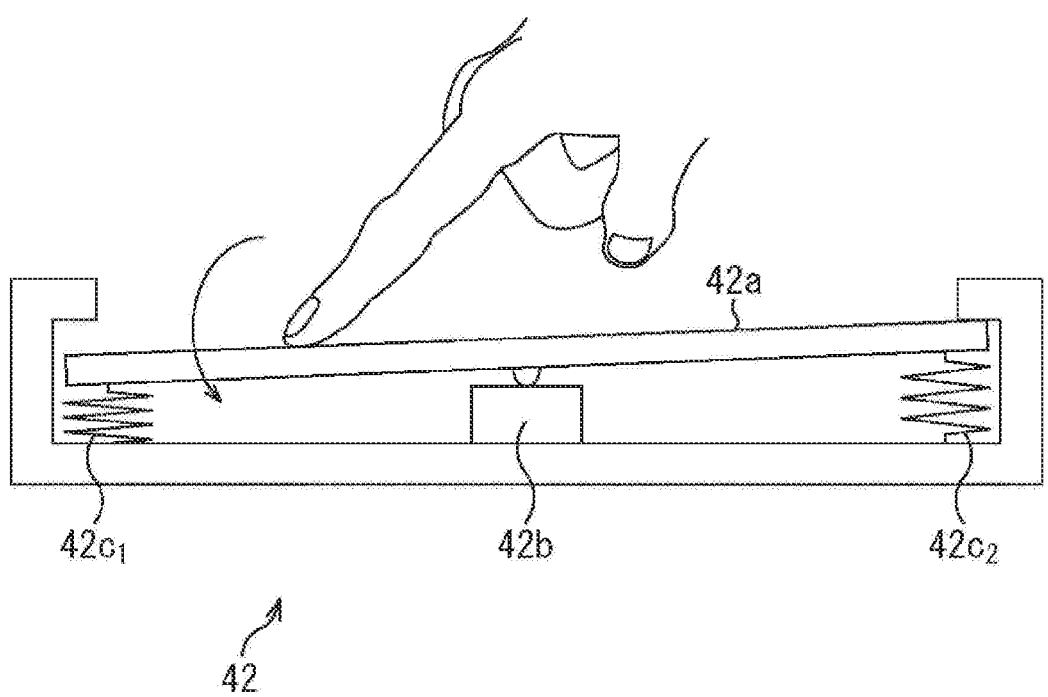
FIG. 2 is a diagram illustrating a detailed configuration example of a touch pad.

Next, FIG. 2 illustrates a detailed configuration example of the touch pad 42.

The touch pad 42 forms a part of the remote controller 21, and is constituted of the operation surface 42a, a switch 42b, and elastic bodies $42c_1$ and $42c_2$.

The operation surface 42a includes a capacitance sensor or the like that detects a change in electrostatic capacitance of the operation surface 42a, and detects the contact of the finger of the user or the like with the operation surface 42a on the basis of the change in the electrostatic capacitance of the operation surface 42a.

The switch 42b is provided on a back side of the operation surface 42a (the back side of the surface where the contact and pressure of the finger of the user or the like are performed), and is turned from an off state to an on state by being pressurized by the operation surface 42a. That is, the switch 42b detects the pressure of the finger of the user or the like on the operation surface 42a in response to the fact that it is turned to the on state.

Also, the detection result on the operation surface 42a and the detection result in the switch 42b are outputted to a processing unit 43 (to be described later in FIG. 3) that detects the operation content and the operation target of the user operation.

The elastic bodies $42c_1$ and $42c_2$ are the elastic bodies of a spring or the like, and support the operation surface 42a so as to be in parallel with a bottom surface of the remote controller 21 when the pressure on the operation surface 42a is not being performed.

Now, the operation surface 42a can also detect the pressure (pressurization) of the finger of the user or the like on the operation surface 42a, on the basis of the change in the electrostatic capacitance. Therefore, when the pressure on the operation surface 42a is also detected on the operation surface 42a, the switch 42b can be omitted.

[Configuration Example of Remote Controller 21]

Figure 3:
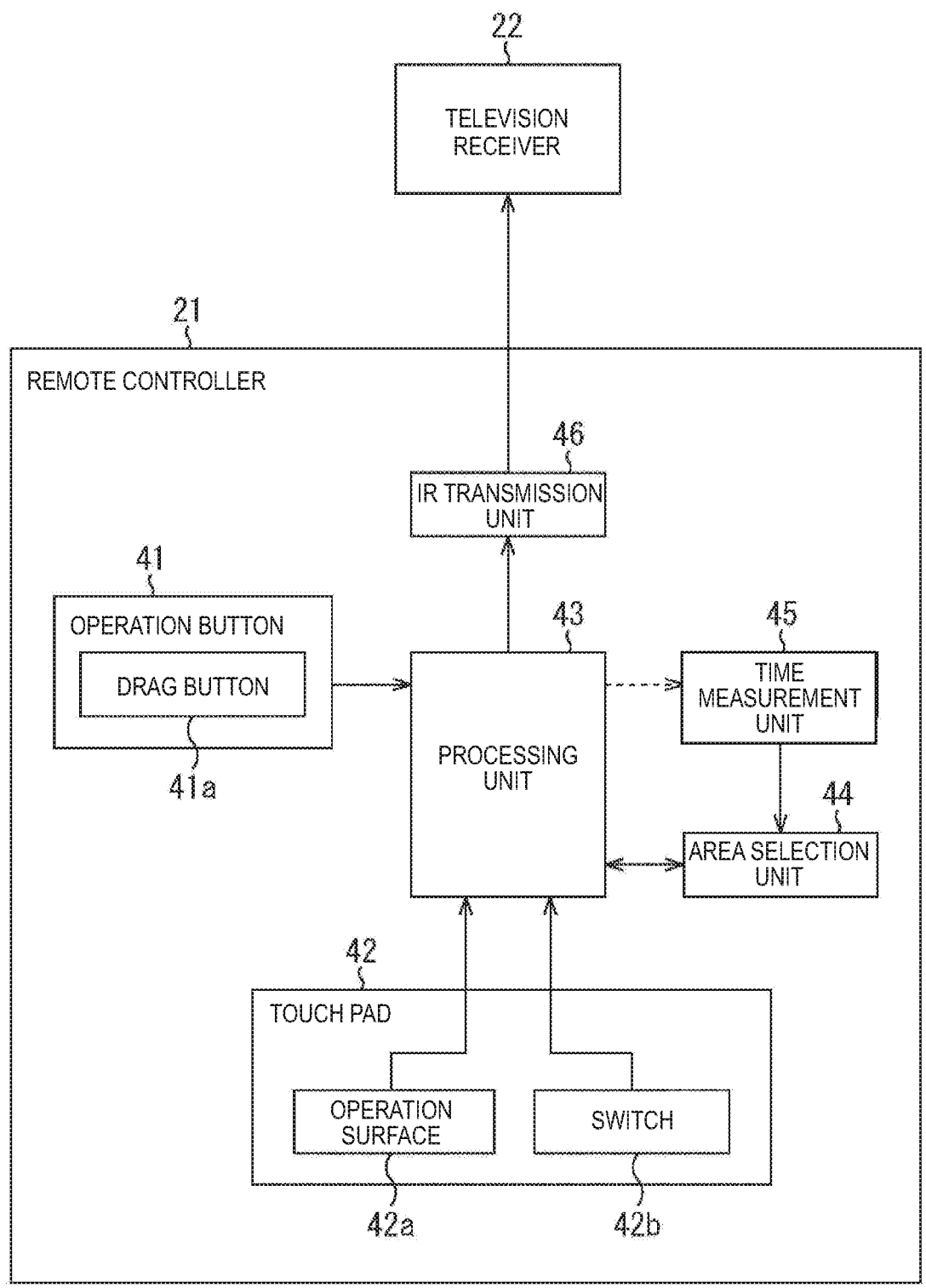
FIG. 3 is a block diagram illustrating a configuration example of a remote controller.

Next, FIG. 3 illustrates a configuration example of the remote controller 21. The remote controller 21 is constituted of the operation buttons 41 including the drag button 41a, the touch pad 42 mainly including the operation surface 42a and the switch 42b, the processing unit 43, an area selection unit 44, a time measurement unit 45, and an IR transmission unit 46.

The operation buttons 41 are, as illustrated in FIG. 1, composed of the drag button 41a or the like in addition to the power button, the reproduction button, the stop button and the like, and operated by the user. The operation buttons 41 supply operation signals corresponding to the operation by the user to the processing unit 43 according to the fact that the operation buttons are operated by the user.

The touch pad 42 is, as illustrated in FIG. 2, constituted mainly of the operation surface 42a and the switch 42b. The operation surface 42a detects the contact with the operation surface 42b on the basis of the change in the electrostatic capacitance of the operation surface 42a, and supplies the detection result to the processing unit 43. The switch 42b detects the pressure on the operation surface 42a, and supplies the detection result to the processing unit 43.

The processing unit 43 calculates the position when the contact of the finger of the user or the like with the operation surface 42a is started, as the start position on the operation surface 42a, on the basis of the detection results from the operation surface 42a and the switch 42b, and supplies it to the area selection unit 44.

Also, the processing unit 43 detects the operation content of the user operation and the operation target of the user operation, on the basis of the detection results supplied from the operation surface 42a and the switch 42b and (information indicating) the target user operation area from the area selection unit 44, and supplies the detection result to the IR transmission unit 46.

Further, when a series of user operations to the operation surface 42a are ended, the processing unit 43 determines whether or not the last user operation is a moving contact operation of moving the pointer or the like, on the basis of the detection results from the operation surface 42a and the switch 42b.

Then, when it is determined that the last user operation is the moving contact operation of moving the pointer or the like on the basis of the detection results from the operation surface 42a and the switch 42b, the processing unit 43 controls the time measurement unit 45, and makes it start measuring required time to be described later.

Also, when a new series of user operations to the operation surface 42a are started, the processing unit 43 controls the time measurement unit 45, and makes it end measurement of the required time.

Thus, the time measurement unit 45 measures the required time needed after the finger of the user or the like is released from the operation surface 42a until it is brought into contact according to the control from the processing unit 43, and supplies it to the area selection unit 44.

Further, the processing unit 43 detects the operation content and the operation target of the user operation to the operation buttons 41, on the basis of the operation signals from the operation buttons 41, and supplies the detection result to the IR transmission unit 46.

The area selection unit 44 selects the target user operation area indicating the user operation area to be the target of the user operation from the plurality of user operation areas A, $B_1$, $B_2$ and C on the operation surface 42a, on the basis of the start position from the processing unit 43, and supplies it to the processing unit 43.

Also, when the required time is supplied from the time measurement unit 45, the area selection unit 44 selects the target user operation area from the plurality of user operation areas A, $B_1$, $B_2$ and C, on the basis of the required time from the time measurement unit 45 as well in addition to the start position from the processing unit 43.

A first selection method with which the area selection unit 44 selects the target user operation area on the basis of the start position from the processing unit 43 will be described in detail with reference to FIGS. 4A, 4B, 5, 6A, and 6B. Also, a second selection method with which the area selection unit 44 selects the target user operation area on the basis of the required time from the time measurement unit 45 as well in addition to the start position from the processing unit 43 will be described in detail with reference to FIG. 7.

As described above, the time measurement unit 45 measures the required time needed after the finger of the user or the like is released from the operation surface 42a until it is brought into contact according to the control from the processing unit 43, and supplies the required time obtained by the measurement to the area selection unit 44.

The IR transmission unit 46 generates the IR signals for controlling the television receiver 22 on the basis of the detection result from the processing unit 43, and transmits the IR signals to the television receiver 22 as the radio signals. That is, for instance, the IR transmission unit 46 decides the operation corresponding to the target user operation area on the basis of the detection result from the processing unit 43, and generates and transmits the IR signals for making the decided operation be performed.

Figure 4A:
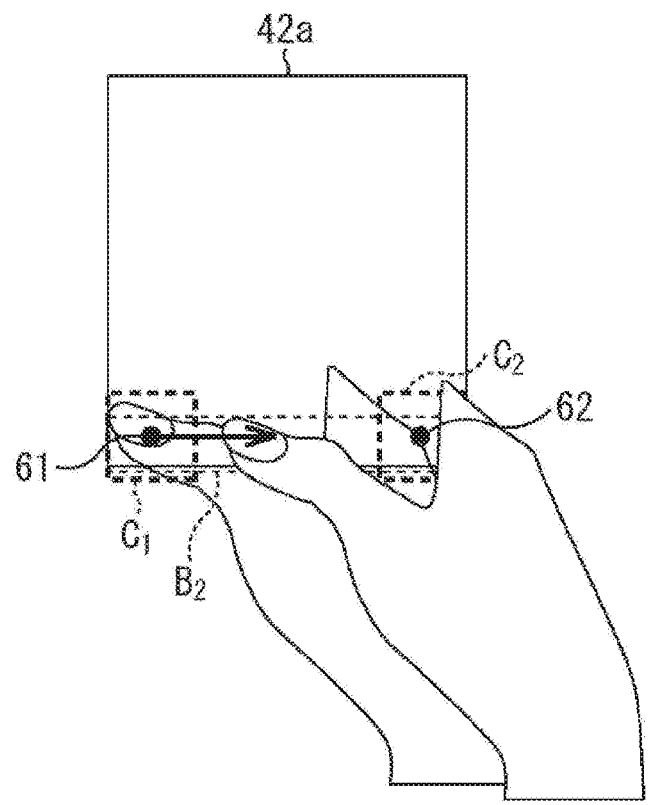
FIGS. 4A and 4B are diagrams illustrating one example of the time when a display screen is scrolled against an intention of a user.
Figure 4B:
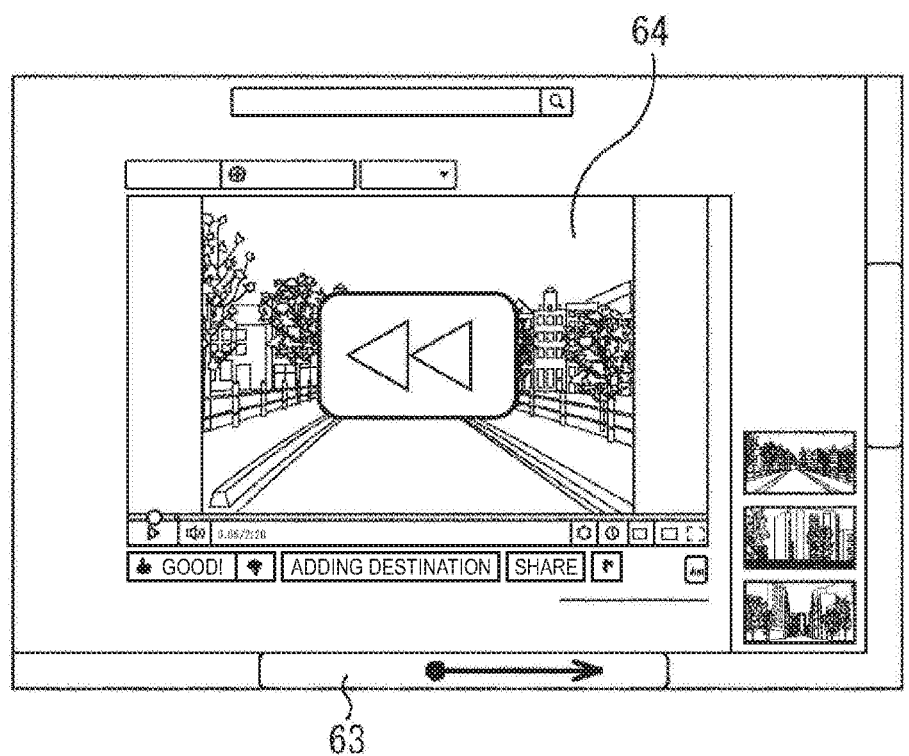

Next, FIGS. 4A and 4B illustrate one example of the time when the display screen of the television receiver 22 is scrolled against an intention of the user since the contact moving operation is performed after the click operation.

FIG. 4A illustrates one example of the time when the click operation is performed at a click position 61 inside the FR button area $C_1$, the contact moving operation is performed from the click position 61 to a click position 62 inside the FF button area $C_2$, and a new click operation is performed at the click position 62 as a series of user operations.

It is assumed that the user is performing the series of user operations illustrated in FIG. 4A with the intention of rewinding and fast-forwarding the content displayed at the television receiver 22 in order to reproduce the content from a desired reproducing position.

Also, it is assumed that the click position 61 is the start position on the operation surface 42a.

FIG. 4B illustrates one example of the time when the display screen displaying content 64 is scrolled against the intention of the user since a scroll bar 63 is moved in a right direction in the figure by the series of user operations illustrated in FIG. 4A on the display screen of the television receiver 22.

For instance, when the user performs the series of user operation as illustrated in FIG. 4A, on the display screen of the television receiver 22, the content 64 is rewound by the click operation at the click position 61 as illustrated in FIG. 4B.

Then, on the display screen of the television receiver 22, the scroll bar 61 may be moved against the intention of the user and the display screen may be scrolled by the contact moving operation performed inside the edge scroll area $B_2$.

Therefore, the area selection unit 44 of the remote controller 21 selects the button area C as the target user operation area C from the plurality of user operation areas A, $B_1$, $B_2$ and C, on the basis of the click position 61 as the start position on the operation surface 42*a*.

Then, the processing unit 43 detects only the user operation targeting the target user operation area C selected in the area selection unit 44 until the series of user operations to the operation surface 42*a* are ended.

Thus, until the series of user operations illustrated in FIG. 4A are ended, in the processing unit 43, only the pressing operation targeting the button area C (the FR button area $C_1$ and the FF button area $C_2$) is detected.

Also, the processing unit 43 identifies the end of the series of user operations illustrated in FIG. 4A when it is determined that the finger of the user or the like is released from the operation surface 42*a*, for instance.

For instance, the processing unit 43 may identify the end of the series of user operations illustrated in FIG. 4A when it is determined that the finger of the user is in contact for the predetermined time or longer at an arbitrary position on the operation surface 42*a*.

In this case, the processing unit 43 calculates a new start position assuming that the contact of the finger of the user or the like is newly started when it is determined that the finger of the user is in contact for the predetermined time or longer at the arbitrary position on the operation surface 42*a* after identifying the end of the series of user operations for instance.

Figure 5:
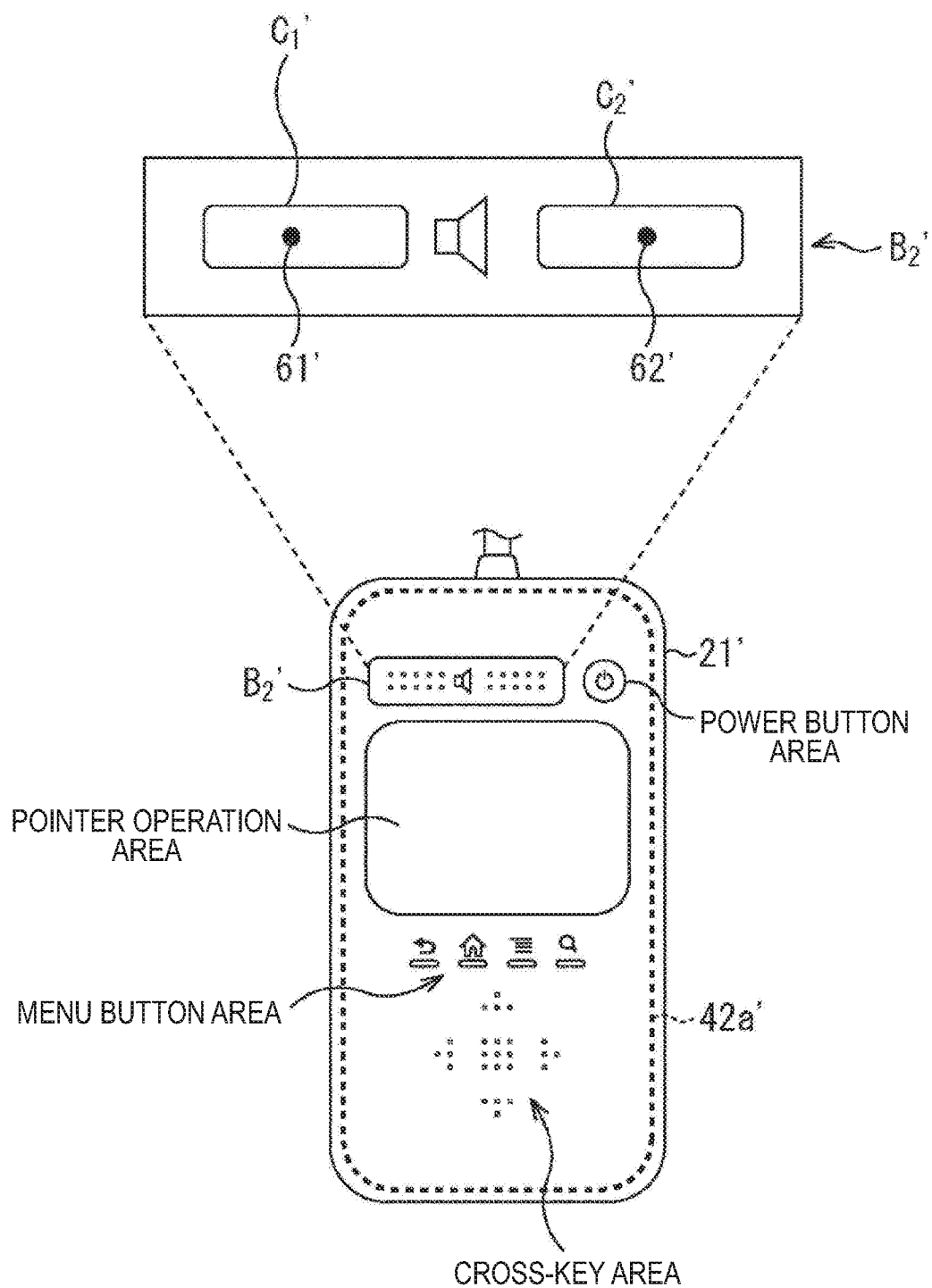
FIG. 5 is a diagram illustrating an appearance example of another remote controller to which the present technology is applied.

Also, the present technology is not limited to the remote controller 21 as illustrated in FIG. 1, and is also applicable to a remote controller 21' as illustrated in FIG. 5 for instance.

In the remote controller 21' in FIG. 5, the entire surface of the remote controller 21' is an operation surface 42*a'*.

On the operation surface 42*a'*, as illustrated on a lower side in FIG. 5, for instance, a volume operation area $B_2'$ to be operated when changing the sound volume (volume), a power button area that functions as a power button, a pointer operation area, a menu button area that functions as a menu button, and a cross key area that functions as cross keys are provided.

In the volume operation area $B_2'$, the sound volume of the content is the operation target, and the contact moving operation is adopted as the operation content of the user operation.

Therefore, for instance, when the user performs the contact moving operation of moving the finger of the user or the like from a left direction to a right direction in the figure on the volume operation area $B_2'$, the sound volume of the content displayed on the display screen is turned to a larger sound volume.

Also, for instance, when the user performs the contact moving operation of moving the finger of the user or the like from the right direction to the left direction in the figure on the volume operation area $B_2'$, the sound volume of the content displayed on the display screen is turned to a smaller sound volume.

Also, the longer a moving distance of the finger of the user or the like is or the faster the movement when moving the finger of the user or the like is, the greater the sound volume is to change.

In the volume operation area $B_2'$, as illustrated on an upper side in FIG. 5, a volume down area $C_1'$ is overlapped and provided in a rectangular area present on the left side in the figure, and a volume up area $C_2'$ is overlapped and provided in a rectangular area present on the right side in the figure.

The volume down area $C_1'$ and the volume up area $C_2'$ configure a volume area C' where the sound volume of the content is the operation target and the pressing operation is adopted as the operation content of the user operation.

For instance, when the user performs the pressing operation on the volume down area $C_1'$, the sound volume of the content displayed on the display screen is turned to the sound volume smaller by a predetermined change amount.

Also, when the user performs the pressing operation on the volume up area $C_2'$, the sound volume of the content displayed on the display screen is turned to the sound volume larger by a predetermined change amount.

In FIG. 5, on the operation surface 42*a'*, as the user operation areas for which the operation target is the same though the operation content of the user operation is different, the volume operation area $B_2'$ and the volume area C' (the volume down area $C_1'$ and the volume up area $C_2'$) are overlapped and arranged.

For instance, when the user performs the series of user operation for adjusting the sound volume by performing the click operation to the volume down area $C_1'$ and the volume up area $C_2'$, a phenomenon similar to the case described in FIGS. 4A and 4B may occur against the intention of the user.

Also, the volume operation area $B_2'$, the volume down area $C_1'$, and the volume up area $C_2'$ correspond to the edge scroll area $B_2$, the FR button area $C_1$, and the FF button area $C_2$ illustrated in FIG. 4A, respectively.

That is, for instance, the user performs the click operation at a click position 61' on the volume down area $C_1'$, and then moves the finger from the click position 61' to a click position 62' in order to newly perform the click operation at the click position 62' on the volume down area $C_2'$.

In this case, the contact moving operation from the click position 61' to the click position 62' is to be performed in the volume operation area $B_2'$, and the sound volume may increase by a change amount according to the speed of the finger of the user or the like against the intention of the user.

Therefore, similarly in the remote controller 21', the volume area C' is selected as the target user operation area C' from the plurality of user operation areas $B_2'$ and C', on the basis of the click position 61' as the start position on the operation surface 42*a'*.

Then, the remote controller 21' detects only the user operation targeting the target user operation area C until the series of user operations to the operation surface 42*a'* are ended.

Thus, until the series of user operations for adjusting the sound volume are ended, in the remote controller 21', only the pressing operation targeting the volume area C' (the volume down area $C_1'$ and the volume up area $C_2'$) is detected.

That is, as described with reference to FIG. 1 to FIG. 5, the present technology is applicable to the following remote controller.

That is, the present technology is applicable to the remote controller including the operation surface where the user operation areas which are the target of the user operation and detected according to the user operation and in which at least one of the operation content of the user operation and the operation target of the user operation is different are overlapped and arranged.

Specifically, for instance, the present technology is applicable to the remote controller 21 including the operation surface 42*a* where the user operation areas for which the operation content of the user operation is the same and the operation target is different are overlapped and arranged.

Also, for instance, the present technology is applicable to the remote controller 21 including the operation surface 42*a* where the user operation areas for which the operation content and the operation target of the user operation are both different are overlapped and arranged.

Further, the present technology is applicable to the remote controller 21' including the operation surface 42a' where the volume operation area $B_2$' and the volume area C' are overlapped and arranged as the user operation areas for which the operation content of the user operation is different and the operation target is the same.

Figure 6A:
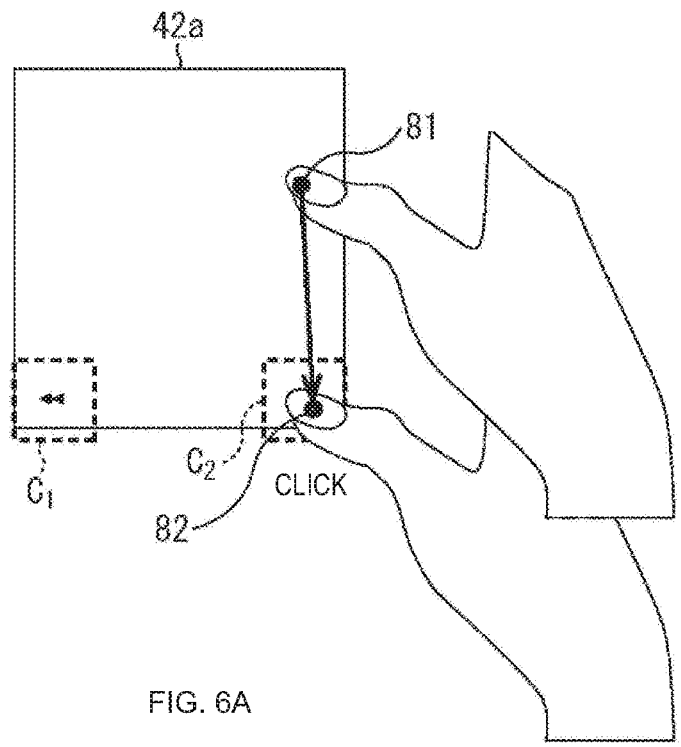
FIGS. 6A and 6B are diagrams illustrating one example of the time when content is fast-forwarded against an intention of a user.
Figure 6B:
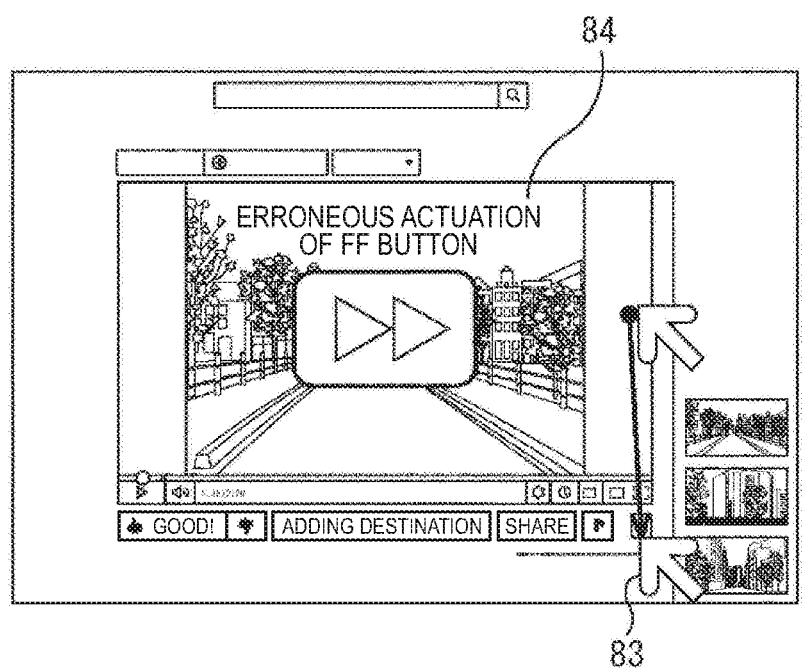

Next, FIGS. 6A and 6B illustrate one example of the time when the content is fast-forwarded against the intention of the user since the click operation of making a decision is performed at a position indicated by the pointer after the contact moving operation of moving the pointer.

FIG. 6A illustrates one example of the time when the contact moving operation of the finger of the user is performed from a start position 81 to a click position 82 in the state that the finger of the user is in contact with the operation surface 42a, and the click operation is performed at the click position 82 after the contact moving operation as the series of user operations.

The start position 81 is assumed to be a position on the pointer operation area A where any of the edge scroll areas $B_1$ and $B_2$, the FR button area $C_1$, and the FF button area $C_1$ is not overlapped.

FIG. 6B illustrates one example of the time when content 84 is fast-forwarded against the intention of the user by the series of user operations illustrated in FIG. 6A.

For instance, when the user performs the series of user operations as illustrated in FIG. 6A, on the display screen of the television receiver 22, a pointer 83 is moved in a downward direction as illustrated in FIG. 6B by the contact moving operation of moving from the start position 81 to the click position 82.

Then, on the display screen of the television receiver 22, the content 84 may be fast-forwarded against the intention of the user by the click operation performed at the click position 82 inside the FF button area $C_2$.

That is, for instance, the content 84 may be fast-forwarded even though the user performs the click operation with the intention of a decision to select the link destination of the URL or the like indicated by the pointer 83.

Therefore, the area selection unit 44 of the remote controller 21 selects the pointer operation area A as the target user operation area A from the plurality of user operation areas A, $B_1$, $B_2$ and C, on the basis of the start position 81 on the operation surface 42a.

Then, the processing unit 43 detects only the user operation targeting the target user operation area A selected in the area selection unit 44 until the series of user operations to the operation surface 42a are ended.

Thus, since the processing unit 43 detects the click operation at the click position 82 as the click operation intended to make a decision to select the link destination of the URL or the like indicated by the pointer 83, it is possible to prevent the situation that the content 84 is fast-forwarded against the intention of the user.

While the example of the time when the click operation is performed at the click position 82 has been described in FIG. 6A, for instance, it is possible that the user releases the contact of the finger of the user once at the click position 82 and then performs the tap operation at the click position 82.

In this case, when the tap operation is performed immediately after the contact of the finger of the user is released, the tap operation is intended to make a decision at the position indicated by the pointer 83. Also, when the tap operation is performed after the lapse of a certain length of time after the contact of the finger of the user is released, the tap operation is intended to fast-forward the content 84.

Figure 7:
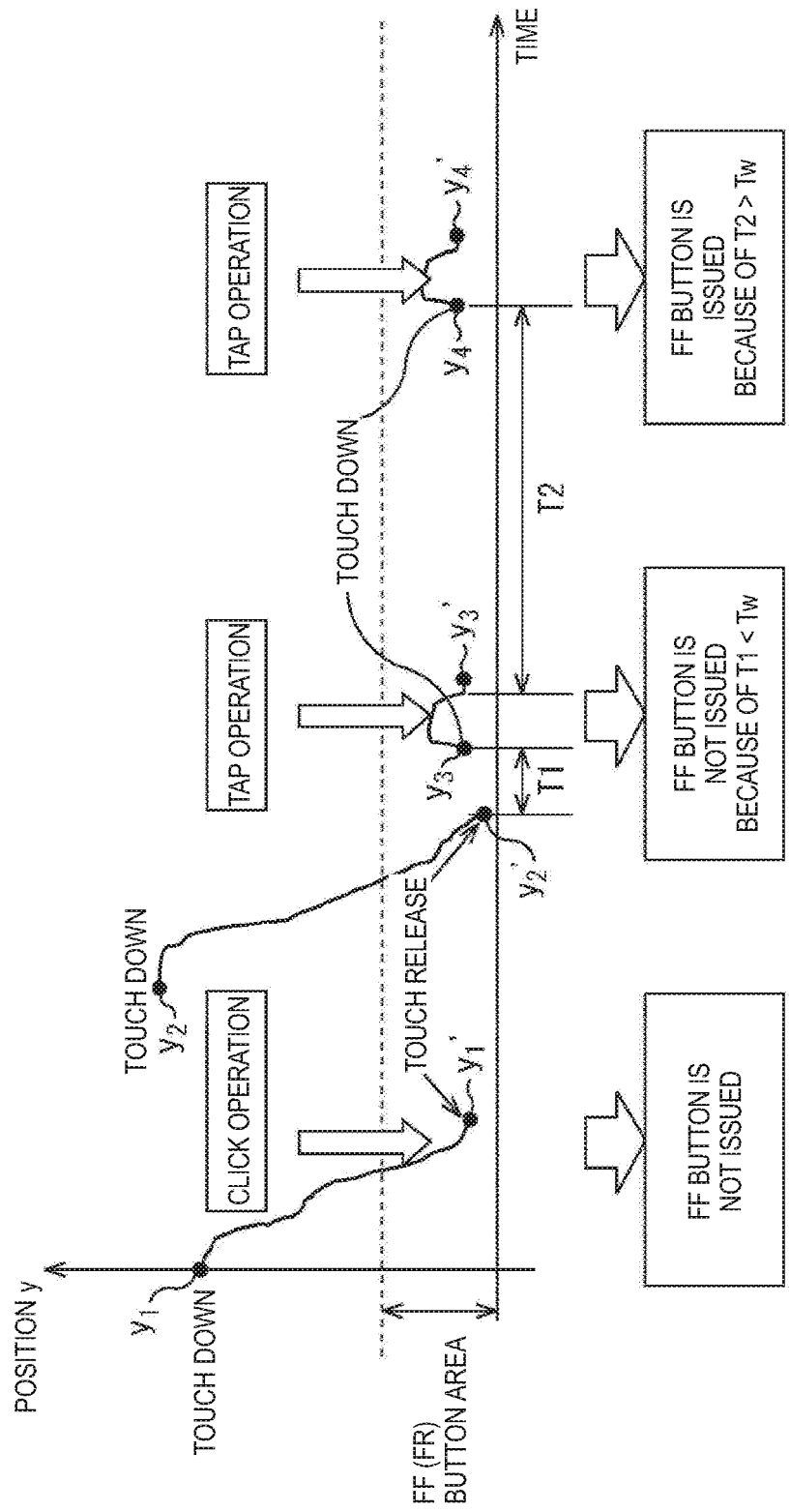
FIG. 7 is a diagram illustrating one example of a determination method for determining a tap operation intended by a user.

Next, FIG. 7 illustrates one example of the time when determining whether the tap operation performed at the click position 82 is the tap operation intended to make a decision at the position indicated by the pointer 83 or the tap operation intended to fast-forward the content 84.

In FIG. 7, a horizontal axis indicates the time and a vertical axis indicates a position y in a Y axis direction on the operation surface 42a. Here, the Y axis direction is the direction where the edge scroll area $B_1$ extends vertically long. In FIG. 7, in order to simplify descriptions, a position x in an X axis direction vertical to a Y axis is omitted. Also, in FIG. 7, positions $y_1$, $y_2$, $y_3$ and $y_4$ indicate the start position when the contact with the operation surface 42a is started, respectively.

Further, at the positions $y_1$, $y_2$, $y_3$ and $y_4$, the positions $y_1$ and $y_2$ indicate the positions on the pointer operation area A where any of the edge scroll areas $B_1$ and $B_2$, the FR button area $C_1$, and the FF button area $C_2$ is overlapped, respectively. Also, the positions $y_3$ and $y_4$ indicate the positions on the FF button area $C_2$.

Further, positions $y_1$', $y_2$', $y_3$' and $y_4$' indicate the positions on the FF button area $C_2$ and are the positions when the contact with the operation surface 42a is released, respectively.

As illustrated on a left side in FIG. 7, when the contact moving operation is performed from the position $y_1$ to the position $y_1$' and the click operation is performed at the position $y_1$', the area selection unit 44 selects the pointer operation area A as the target user operation area A on the basis of the start position $y_1$ as the start position 81.

In this case, the click operation at the position $y_1$' is detected by the processing unit 43 as the click operation intended to make a decision at the position indicated by the pointer 83.

Also, as illustrated at the center in FIG. 7, the area selection unit 44 selects the target user operation area on the basis of whether or not required time T1 after the contact moving operation is performed from the position $y_2$ to the position $y_2$' and the contact of the finger of the user or the like is released at the position $y_2$' until the tap operation is performed is shorter than predetermined fixed time Tw.

Here, the required time T1 is the time needed after the contact of the finger of the user or the like is released at the position $y_2$' until the finger of the user or the like is brought into contact at the position $y_3$ by the tap operation.

At the center in FIG. 7, since the required time T1 is shorter than the fixed time Tw, the area selection unit 44 selects the pointer operation area A as the target user operation area A.

In this case, the tap operation at the position $y_3$ is detected by the processing unit 43 as the tap operation intended to make a decision at the position indicated by the pointer 83, and the tap operation intended to fast-forward the content 84 is not detected.

Further, as illustrated on the right side in FIG. 7, the area selection unit 44 selects the target user operation area on the basis of whether or not required time T2 after the contact of the finger of the user or the like is released at the position $y_3$' until the tap operation is performed is shorter than predetermined fixed time Tw.

Here, the required time T2 is the time needed after the contact of the finger of the user or the like is released at the position $y_3$' until the finger of the user or the like is brought into contact at the position $y_4$ by the tap operation.

On the right side in FIG. 7, since the required time T2 is not shorter than the fixed time Tw, the area selection unit 44 selects the button area C (the FR button area $C_1$ and the FF button area $C_2$) as the target user operation area C.

In this case, the tap operation at the position $y_4$ is detected by the processing unit 43 as the tap operation intended to fast-forward the content 84.

[Operation Description of Remote Controller 21 in FIG. 3]

Figure 8:
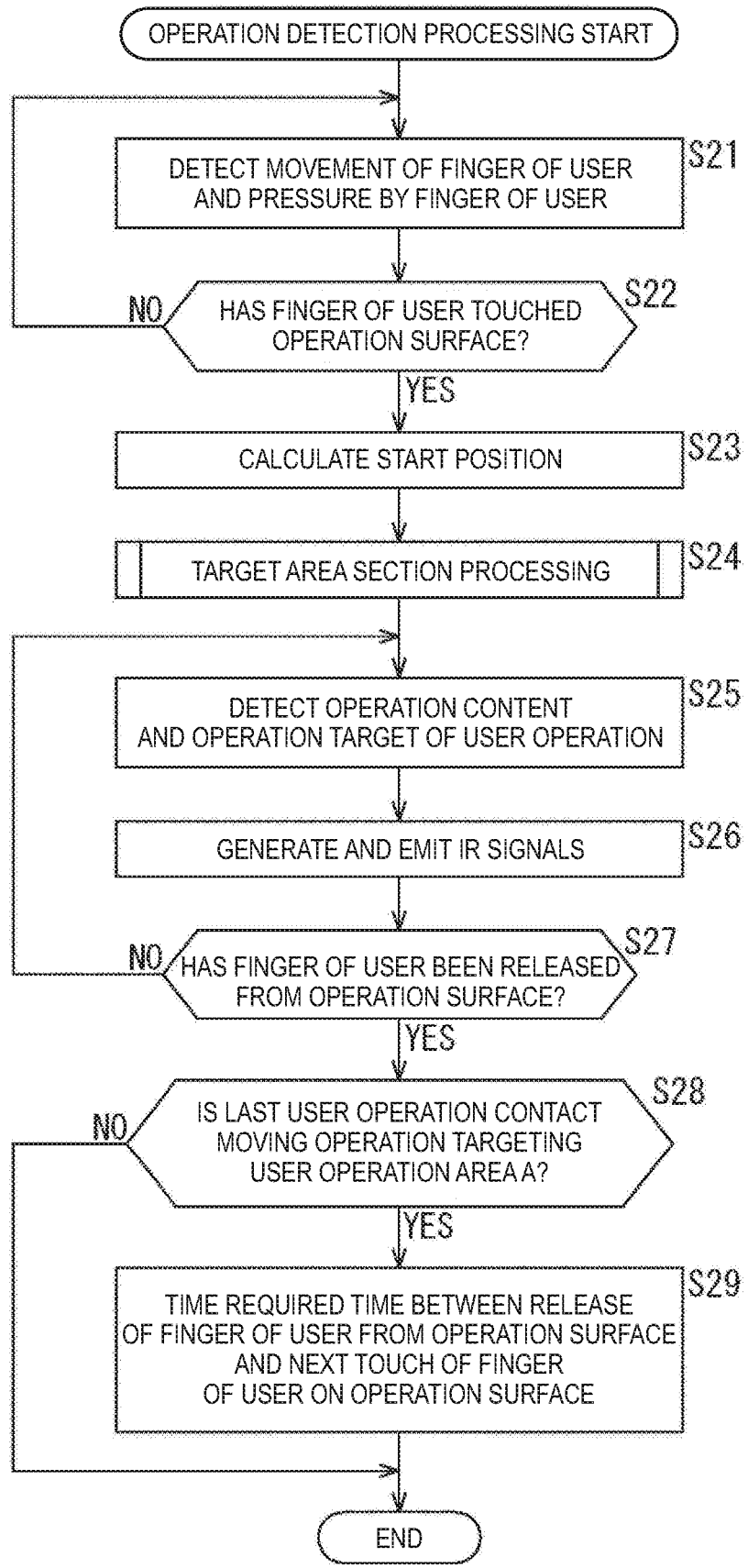
FIG. 8 is a flowchart for illustrating operation detection processing performed by the remote controller in FIG. 3.

Next, with reference to a flowchart in FIG. 8, operation detection processing performed by the remote controller 21 in FIG. 3 will be described.

In step S21, the touch pad 42 detects the contact with and the pressure on the operation surface 42a, and supplies the detection result to the processing unit 43.

That is, the operation surface 42a of the touch pad 42 detects the contact of the finger of the user or the like with the operation surface 42a, on the basis of the change in the electrostatic capacitance obtained from a built-in capacitance sensor or the like, and supplies the detection result to the processing unit 43.

The switch 42b of the touch pad 42 detects the pressure on the operation surface 42a, and supplies the detection result to the processing unit 43.

In step S22, the processing unit 43 determines whether or not the finger of the user or the like is brought into contact with the operation surface 42a on the basis of the detection results from the operation surface 42a and the switch 42b, and repeats the processing in step S21 and step S22 until it is determined that the finger of the user or the like is brought into contact with the operation surface 42a.

Then, in step S22, when it is determined that the finger of the user or the like is brought into contact with the operation surface 42a on the basis of the detection results from the operation surface 42a and the switch 42b, the processing unit 43 advances the processing to step S23.

In step S23, the processing unit 43 calculates the start position on the operation surface 42a on the basis of the detection results from the operation surface 42a and the switch 42b, and supplies it to the area selection unit 44.

In step S24, the area selection unit 44 performs target area selection processing of selecting the target user operation area to be the target of the series of user operations from the plurality of user operation areas A, $B_1$, $B_2$ and C on the basis of the start position on the operation surface 42a from the processing unit 43.

The area selection unit 44 supplies the target user operation area selected by the target area selection processing to the processing unit 43.

Figure 9:
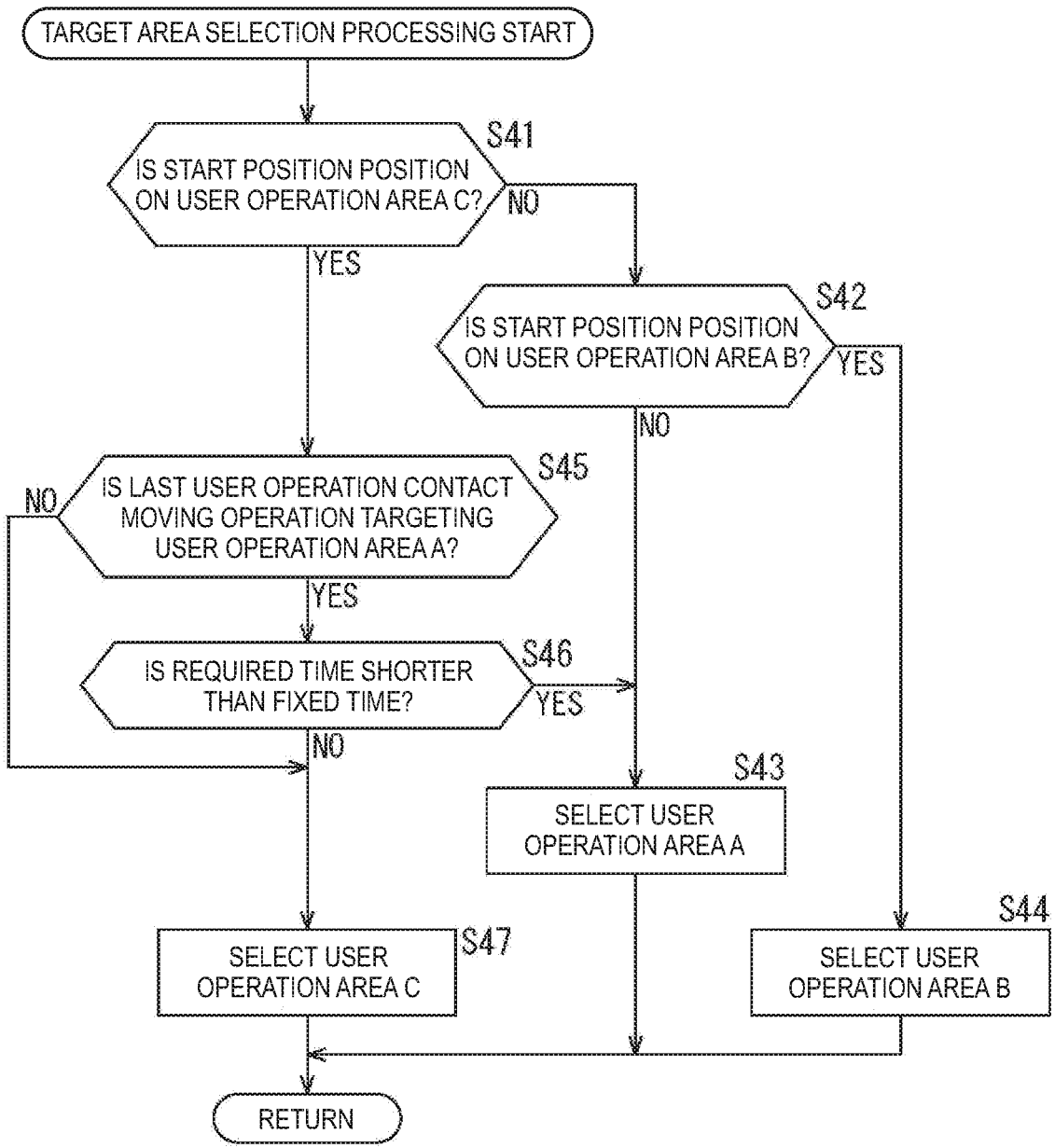
FIG. 9 is a flowchart for illustrating details of target area selection processing in step S24.

Also, the target area selection processing in step S24 will be described in detail with reference to a flowchart in FIG. 9.

In step S25, the processing unit 43 detects the operation content of the user operation to the operation surface 42a and the operation target of the user operation on the basis of the detection results from the operation surface 42a and the switch 42b and the target user operation area from the area selection unit 44, and supplies the detection result to the IR transmission unit 46.

In step S26, the IR transmission unit 46 generates the IR signals for controlling the television receiver 22 on the basis of the detection result from the processing unit 43, and transmits (emits) them to the television receiver 22 as the radio signals.

In step S27, the processing unit 43 determines whether or not the finger of the user or the like in contact with the operation surface 42a is released from the operation surface 42a, on the basis of the detection results from the operation surface 42a and the switch 42b.

When it is determined that the finger of the user or the like is not released from the operation surface 42a on the basis of the detection results from the operation surface 42a and the switch 42b, the processing unit 43 returns the processing to step S25, and the similar processing is performed thereafter in step S25.

Also, when it is determined that the finger of the user or the like is released from the operation surface 42a on the basis of the detection results from the operation surface 42a and the switch 42b, that is, when it is determined that the series of user operations are ended, the processing unit 43 advances the processing to step S28.

In step S28, the processing unit 43 determines whether or not the last user operation is the contact moving operation targeting the pointer operation area A in response to the determination of the end of the series of user operations.

When it is determined that the last user operation is not the contact moving operation targeting the pointer operation area A, the processing unit 43 skips step S29, and ends the operation detection processing.

Also, in step S28, when it is determined that the last user operation is the contact moving operation targeting the pointer operation area A, the processing unit 43 advances the processing to step S29, and controls the time measurement unit 45.

In step S29, the time measurement unit 45 measures the required time needed after the finger of the user or the like is released from the operation surface 42a until it is brought into contact with the operation surface 42a again according to the control from the processing unit 43.

Also, in step S29, the time measurement unit 45 ends the measurement of the required time according to the control from the processing unit 43 and supplies the measured required time to the area selection unit 44, and the operation detection processing is ended. That is, the processing unit 43 makes the time measurement unit 45 measure the required time until it is determined that the finger of the user or the like is brought into contact with the operation surface 42a in step S22 of new operation detection processing.

[Details of Target Area Selection Processing]

Next, with reference to the flowchart in FIG. 9, details of the target area selection processing in step S24 in FIG. 8 will be described.

In step S41, the area selection unit 44 determines whether or not the start position on the operation surface 42a from the processing unit 43 is the position on the user operation area C.

When it is determined that the start position on the operation surface 42a from the processing unit 43 is not the position on the user operation area C, the area selection unit 44 advances the processing to step S42.

In step S42, the area selection unit 44 determines whether or not the start position on the operation surface 42a from the processing unit 43 is the position on the user operation areas $B_1$ or $B_2$.

Then, when it is determined that the start position on the operation surface 42a from the processing unit 43 is not the position on the user operation area $B_1$ or $B_2$, that is, when it is determined that it is the position on the user operation area A where any of the user operation areas $B_1$, $B_2$ and C is not overlapped, the area selection unit 44 advances the processing to step S43.

In step S43, the area selection unit 44 selects the user operation area A as the target user operation area A.

Also, in step S42, when it is determined that the start position on the operation surface 42a from the processing unit 43 is the position on the user operation area $B_1$ or $B_2$, the area selection unit 44 advances the processing to step S44, and selects the user operation area B (one of the user operation areas $B_1$ and $B_2$) including the start position.

In step S41, when it is determined that the start position on the operation surface 42a from the processing unit 43 is the position on the user operation area C, the area selection unit 44 advances the processing to step S45.

In step S45, the area selection unit 44 determines whether or not the last user operation is the contact moving operation targeting the user operation area (pointer operation area) A, on the basis of whether or not the required time is supplied from the time measurement unit 45.

When it is determined that the last user operation is not the contact moving operation targeting the user operation area A, the area selection unit 44 skips step S46, and advances the processing to step S47.

Also, in step S45, when it is determined that the last user operation is the contact moving operation targeting the user operation area A, that is, when the required time is supplied from the time measurement unit 45, the area selection unit 44 advances the processing to step S46.

In step S46, the area selection unit 44 determines whether or not the required time from the time measurement unit 45 is shorter than the predetermined fixed time Tw, and when it is determined that the required time is shorter than the fixed time, advances the processing to step S43, and selects the user operation area A as the target user operation area A.

Also, in step S46, when it is determined that the required time from the time measurement unit 45 is not shorter than the predetermined fixed time Tw, the area selection unit 44 advances the processing to step S47, and selects the user operation area C as the target user operation area C. Thereafter, the processing returns to step S24 in FIG. 8, and the processing thereafter is performed.

As described above, in the operation detection processing, the target user operation area to be the target of the user operation is selected from the plurality of user operation areas on the basis of the start position on the operation surface 42a, for instance.

Therefore, in the remote controller 21 or the like including the operation surface 42a where the user operation areas A, $B_1$, $B_2$ and C which are detected according to the user operation and in which at least one of the operation content and the operation target of the user operation is different are overlapped and arranged, it is possible to prevent the situation of detecting the operation against the intention of the user.

Thus, in the remote controller 21, it is possible to improve operability to the operation surface 42a.

Now, when the user performs the pressing operation to the operation surface 42a, the contact surface on the operation surface 42a where the finger of the user is brought into contact changes according to the change of a pressure to the operation surface 42a.

Since coordinates calculated according to the user operation are calculated on the basis of the area of the contact surface of the finger of the user and the operation surface 42a, for instance, the pointer may be moved against the intention of the user during the pressing operation. Also, the coordinates are calculated as the ones indicating the position of the pointer 83 on the display screen, for instance.

Then, it is desirable to prevent the movement of the pointer 83 against the intention of the user by fixing the coordinates of the pointer 83 or the like regardless of the user operation to the operation surface 42a during the pressing operation.

2. Second Embodiment

[Another Configuration Example of Remote Controller 21]

Figure 10:
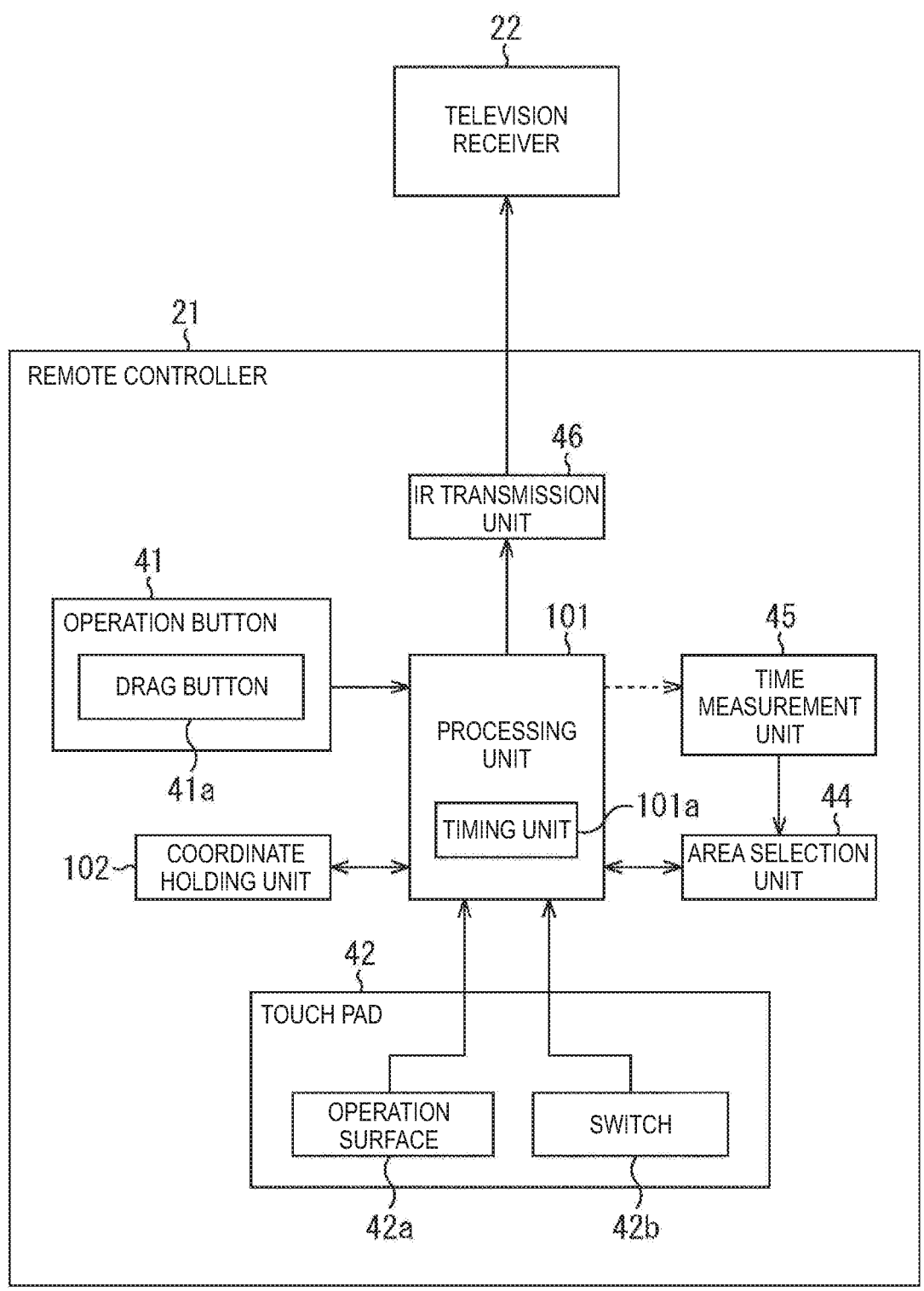
FIG. 10 is a block diagram illustrating another configuration example of the remote controller.

Next, FIG. 10 illustrates another configuration example of the remote controller 21, which improves the operability more by preventing the movement of the pointer against the intention of the user.

In the remote controller 21 in FIG. 10, parts configured similarly to the remote controller in FIG. 3 are denoted with the same reference signs so that the descriptions are appropriately omitted below.

That is, the remote controller 21 in FIG. 10 is configured similarly to the remote controller 21 in FIG. 3 other than that a processing unit 101 incorporating a timing unit 101a is provided instead of the processing unit 43 in FIG. 3 and a coordinate holding unit 102 is newly provided.

The processing unit 101 performs the processing similar to the processing unit 43 in FIG. 3. That is, for instance, the processing unit 101 detects the operation content and the operation target of the user operation on the basis of the detection results from the operation surface 42a and the switch 42b and the target user operation area from the area selection unit 44.

Also, for instance, when the pointer operation area A is supplied as the target user operation area from the area selection unit 44, the processing unit 101 calculates the coordinates of the pointer 83 on the basis of the detected operation content of the user operation, and supplies them to the IR transmission unit 46.

The IR transmission unit 46 generates the IR signals including the coordinates supplied from the processing unit 101 on the basis of the detection result from the processing unit 101, and transmits them to the television receiver 22.

In the second embodiment, the description is given assuming that the processing unit 101 calculates the coordinates of the pointer 83. However, the IR transmission unit 46 may calculate the coordinates of the pointer 83 on the basis of the operation content of the user operation included in the detection result from the processing unit 101, and may generate the IR signals including the calculated coordinates. Further, for instance, the processing unit 101 supplies the coordinates calculated when the depressing operation by the user which targets the pointer operation area A is performed to the coordinate holding unit 102 to be held.

Now, the operation surface 42a can also detect the presence/absence of the pressure of the finger of the user or the like on the operation surface 42a, on the basis of the change in the electrostatic capacitance. Therefore, when the presence/absence of the pressure on the operation surface 42a is also detected on the operation surface 42a, the switch 42b can be omitted.

The processing unit 101 supplies the coordinates already held in the coordinate holding unit 102 from the time when the switch 42b is turned to the off state to the IR transmission unit 46 as the coordinates of the pointer 83 for instance, together with the detection result of the operation content and the operation target of the user operation.

Then, the processing unit 101 performs the processing of supplying the coordinates already held in the coordinate holding unit 102 to the IR transmission unit 46 as the coordinates of the pointer 83 until the elapsed time after the switch 42b is turned to the off state exceeds the predetermined coordinate fixation time.

That is, for instance, the processing unit 101 supplies the coordinates already held in the coordinate holding unit 102 to the IR transmission unit 46 as the coordinates of the pointer 83 in response to the identification that the switch 42b is turned to the on state on the basis of the detection result from the switch 42b.

Then, the processing unit 101 makes the built-in timing unit 101a start timing in response to the identification that the switch 42b is turned to the off state on the basis of the detection result from the switch 42b.

For instance, the processing unit 101 incorporates the timing unit 101a, and the timing unit 101a times the elapsed time after the switch 42b is turned to the off state.

The processing unit 101 determines whether or not the predetermined coordinate fixation time has elapsed from the time when the switch 42b is turned to the off state, on the basis of a timing result of the built-in timing unit 101a.

Then, the processing unit 101 supplies the coordinates already held in the coordinate holding unit 102 to the IR transmission unit 46 until the coordinate fixation time elapses from the time when the switch 42b is turned to the off state.

It is recognized by an analysis result of analyzing log data or the like of general users or the like that the user hardly performs the contact moving operation of moving the pointer 83 or the like immediately after ending the pressure on the operation surface 42b.

Therefore, for instance, the coordinate fixation time is defined as the time shorter than the average time immediately after ending the pressure on the operation surface 42b until performing the contact moving operation of moving the pointer 83 or the like.

The IR transmission unit 46 generates the IR signals including the coordinates supplied from the processing unit 101 similarly on the basis of the detection result from the processing unit 101, and transmits them to the television receiver 22. The coordinates included in the IR signals are used, for instance, as information indicating the position of the pointer 83 or the like on the display screen of the television receiver 22. While the coordinate fixation time is predetermined, otherwise, it may be the different fixation time according to the user for instance.

That is, for instance, before the remote controller 21 in FIG. 10 is used, the processing unit 101 makes the user perform the pressing operation targeting the operation surface 42a, and determines the coordinate fixation time by the area of the contact surface obtained from the pressing operation, the pressing time during which the switch 42b is turned to the on state, and the like.

Further, for instance, the processing unit 101 may hold a history of the area of the contact surface, the pressing time and the like obtained by the pressing operation by the user, and may change the coordinate fixation time on the basis of the history.

Also, for instance, the coordinate fixation time may be appropriately determined on the basis of the pressing time during which the switch 42b is turned to the on state.

The coordinate holding unit 102 holds the coordinates supplied from the processing unit 101.

Next, FIGS. 11A, 11B, 11C, 11D, and 11E illustrate the change of the coordinates during the pressing operation by the user or the like.

FIG. 11A illustrates one example of a situation that the centroid of the contact surface of the operation surface 42a and the finger of the user or the like is changed (displaced) when the pressing operation by the user is performed.

FIG. 11B illustrates one example of the time when the switch 42b is turned to the on state or the off state according to the pressing operation by the user.

FIG. 11C illustrates one example of the situation of the change of the coordinates when the calculated coordinates are outputted as they are without fixing the coordinates.

FIG. 11D illustrates one example of the situation of the change of the coordinates when the coordinates are fixed (locked) only for the pressing time indicating the time during which the switch 42b is turned to the on state.

FIG. 11E illustrates one example of the situation of the change of the coordinates when the coordinates are fixed for the coordinate fixation time longer than the pressing time after the time when the switch 42b is turned to the on state, further.

As illustrated in FIG. 11A, it is recognized by experiments conducted by the present inventor that the centroid of the contact surface with the operation surface 42a is changed by the pressing operation by the user.

When using the coordinates as illustrated in FIG. 11C, the pointer 83 may be moved up and down against the intention of the user in response to the fact that the pressing operation for making a decision at the position of the pointer 83 is performed.

Therefore, as illustrated in FIG. 11D, it is desirable to suppress the situation that the pointer 83 is moved against the intention of the user by fixing the coordinates of the pointer 83 for the pressing time during which the switch 42b is turned to the on state. However, when fixing the coordinates of the pointer 83 for the pressing time, the pointer 83 may be moved in an upward direction as illustrated in FIG. 11D after the switch 42b is turned to the off state.

Therefore, in the present disclosure, as illustrated in FIG. 11E, the coordinates of the pointer 83 or the like are fixed (locked) for some time even after the switch 42b is turned to the off state, and the situation that the pointer 83 is moved against the intention of the user is prevented.

Also, though the coordinates of the time when the switch 42b is turned to the on state are different from the coordinates immediately before the switch 42b is turned to the on state, it is recognized by the experiments conducted by the present inventor that the different is small.

Therefore, in the remote controller 21 in FIG. 10, the coordinates of the time when the switch 42b is turned to the on state are fixed as the coordinates of the pointer 83 or the like.

Also, in the remote controller 21 in FIG. 10, the coordinates prescribed time before the time when the switch 42b is turned to the on state (for instance, the coordinates immediately before it is turned to the on state) may be fixed as the coordinates of the pointer 83 or the like. In this case, it is assumed that the remote controller 21 in FIG. 10 includes a memory that holds the calculated coordinates for a fixed period.

By such a configuration, it is possible to prevent the situation that the coordinates of the pointer 83 or the like is changed when the switch 42b is turned to the on state.

[Operation Description of Remote Controller 21 in FIG. 10]

Next, with reference to a flowchart in FIG. 12, coordinate lock processing performed by the remote controller 21 in FIG. 10 will be described.

In step S61, the processing unit 101 detects the operation content and the operation target of the user operation on the basis of the detection results from the operation surface 42a and the switch 42b and the target user operation area from the area selection unit 44. Then, the processing unit 101 calculates the coordinates of the pointer 83 or the like corresponding to the position on the operation surface 42*a* where the finger of the user or the like is in contact, on the basis of the detection result.

That is, for instance, when the pointer operation area A is supplied as the target user operation area from the area selection unit 44, the processing unit 101 calculates the coordinates of the pointer 83 on the basis of the operation content of the user operation included in the detection result.

In step S62, the processing unit 101 determines presence/absence of the pressure on the operation surface 42*a*, that is, whether or not the switch 42*b* is turned to the on state, on the basis of the detection results from the operation surface 42*a* and the switch 42*b*. When it is determined that the switch 42*b* is not turned to the on state and is kept in the off state, the processing unit 101 advances the processing to step S63.

Also, the processing unit 101 may determine the presence/absence of the pressure on the operation surface 42*a*, on the basis of one of the detection result of the operation surface 42*a* and the detection result from the switch 42*b*.

That is, for instance, the processing unit 101 determines the presence/absence of the pressure on the operation surface 42*a*, on the basis of the detection result of the presence/absence of the pressure on the operation surface 42*a* by the operation surface 42*a*. The operation surface 42*a* can detect the presence/absence of the pressure on the operation surface 42*a* on the basis of the change in the electrostatic capacitance of the operation surface 42*a*.

It can be said that it is equivalent to determine the presence/absence of the pressure on the operation surface 42*a* on the basis of the change in the electrostatic capacitance of the operation surface 42*a* by the processing unit 101.

Also, for instance, the processing unit 101 determines the presence/absence of the pressure on the operation surface 42*a*, on the basis of the detection result from the switch 42*b* indicating which of the on state and the off state the switch 42*b* is in. It can be said that it is equivalent to determine the presence/absence of the pressure on the operation surface 42*a* on the basis of whether or not the switch 42*b* is in the on state by the processing unit 101.

In step S63, the processing unit 101 supplies the coordinates calculated in step S61 to the IR transmission unit 46. Then, the IR transmission unit 46 generates the IR signals including the coordinates from the processing unit 101, and advances the processing to step S66.

Also, in step S62, when it is determined that the switch 42*b* is in the on state on the basis of the detection results from the operation surface 42*a* and the switch 42*b*, the processing unit 101 advances the processing to step S64.

In step S64, the processing unit 101 supplies the coordinates calculated in immediately preceding step S61 as the coordinates of the time when the switch 42*b* is turned to the on state to the coordinate holding unit 102 to be held by overwrite.

In step S65, the processing unit 101 reads the coordinates held in the coordinate holding unit 102 from the coordinate holding unit 102, and supplies them to the IR transmission unit 46. Then, the IR transmission unit 46 generates the IR signals including the coordinates from the processing unit 101, and advances the processing to step S66.

In step S66, the IR transmission unit 46 controls the television receiver 22 by transmitting the generated IR signals to the television receiver 22 as the radio signals.

In step S67, the processing unit 101 determines whether or not the coordinate fixation time has elapsed since the switch 42*b* is turned to the off state, on the basis of the timing result of the timing unit 101*a* that times the elapsed time from the time when the switch 42*b* is turned to the off state. In the processing unit 101, the timing unit 101*a* is incorporated.

When it is determined that the coordinate fixation time has not elapsed since the switch 42*b* is turned to the off state on the basis of the timing result of the timing unit 101*a*, the processing unit 101 returns the processing to step S65, and performs the similar processing thereafter.

Also, when it is determined that the coordinate fixation time has elapsed since the switch 42*b* is turned to the off state on the basis of the timing result of the timing unit 101*a*, the processing unit 101 returns the processing to step S61, and repeats the similar processing thereafter.

As described above, according to the coordinate lock processing, the coordinates of the time when the switch 42*b* is turned to the on state are included in the IR signals and transmitted, from the time when the switch 42*b* is turned to the on state.

Further, even after the switch 42*b* is turned to the off state, the coordinates of the time when the switch 42*b* is turned to the on state are included in the IR signals and transmitted during the coordinate fixation time.

Therefore, the coordinates of the pointer 83 displayed on the display screen of the television receiver 22 are fixed for the fixed time from the time when the depressing operation by the user is performed.

Thus, for instance, since it is possible to prevent the situation that the pointer 83 on the display screen of the television receiver 22 is moved against the intention of the user, the operability of the user operation using the operation surface 42*a* can be improved more.

In the second embodiment, the remote controller 21 in FIG. 10 calculates the coordinates of the pointer 83 on the basis of the detection result from the touch pad 42 or the like, however, the coordinates may be calculated and fixed on the side of the television receiver 22.

In this case, for instance, the remote controller 21 in FIG. 10 detects the operation content and the operation target of the user operation, on the basis of the detection result from the touch pad 42 and the target user operation area from the area selection unit 44. Also, the remote controller 21 in FIG. 10 generates (acquires) pressing information indicating the presence/absence of the pressure on the operation surface 42*a* by determining the presence/absence of the pressure on the operation surface 42*a* on the basis of the detection result from the touch pad 42.

Further, the remote controller 21 in FIG. 10 transmits the detected detection result and the generated pressing information to the television receiver 22. Then, the television receiver 22 receives the detection result and the pressing information from the remote controller 21 in FIG. 10, and performs the processing similar to the coordinate lock processing in FIG. 12 on the basis of the received detection result and pressing information.

That is, for instance, the television receiver 22 calculates the coordinates of the pointer 83 on the basis of the received detection result. Further, the television receiver 22 controls a built-in display so as to fix the coordinates of the pointer 83 for some time after it is determined that the switch 42*b* is turned to the on state on the basis of the received pressing information. In this way, the television receiver 22 prevents the situation that the pointer 83 is moved against the intention of the user.

3. Modification

In the first embodiment, the remote controller 21 selects the target user operation area on the basis of the start position on the operation surface 42*a*, for instance.

However, otherwise, for instance, the area selection unit 44 may select the target user operation area on the basis of the state of the content displayed on the display screen of the television receiver 22 as well in addition to the start position on the operation surface 42a.

Also, in the remote controller 21, the state of the content is recognized on the basis of the user operation to the remote controller 21, for instance. Also, for instance, the state of the content may be recognized by the remote controller 21 by transmitting the state of the content appropriately from the television receiver 22 to the remote controller 21.

That is, for instance, in the case that the content that is being reproduced are displayed on the display screen of the television receiver 22, when the finger of the user or the like is brought into contact with the operation surface 42a, the area selection unit 44 may select the target user operation area defined beforehand regardless of the start position on the operation surface 42a.

Specifically, for instance, the area selection unit 44 selects the user operation area (for instance, the button area C) for which the content that is being reproduced are the operation content, as the target user operation area defined beforehand regardless of the start position on the operation surface 42a.

For instance, in the case that the content that is being reproduced are not displayed on the display screen of the television receiver 22, when the finger of the user or the like is brought into contact with the operation surface 42a, the area selection unit 44 selects the target user operation area on the basis of the start position on the operation surface 42a.

The area selection unit 44 may also select the target user operation area using the start position on the operation surface 42a, the required time until the tap operation, and the state of the content, other than using the start position on the operation surface 42a and the state of the content.

Further, for instance, when the user performs the depressing operation when the pointer 83 is moved onto the content by the contact moving operation targeting the pointer operation area A, on the display screen of the television receiver 22, the content that is being reproduced are displayed.

In this case, for instance, the area selection unit 44 may select the user operation area (for instance, the button area C) for which the content of a reproduction target is the operation target as the target user operation area regardless of the start position on the operation surface 42a or the like, in response to the depressing operation by the user.

Also, it is assumed that the content of the reproduction target is held in a server connected with the television receiver 22 through the Internet or the like, for instance.

Also, for instance, the area selection unit 44 may select the target user operation area on the basis of the state of the user as well in addition to the start position on the operation surface 42a.

That is, for instance, when the user visually recognizes the operation surface 42a, the area selection unit 44 selects the target user operation area on the basis of the start position on the operation surface 42a.

This is because that, when the user performs the user operation in the state of visually recognizing the operation surface 42a, a desired user operation area to be the target of the user operation can be accurately touched with the finger of the user or the like.

Also, for instance, when the user does not visually recognize the operation surface 42a, the area selection unit 44 selects the target user operation area defined beforehand regardless of the start position on the operation surface 42a.

Specifically, for instance, when the user does not visually recognize the operation surface 42a, it is highly possible that the user is viewing the content displayed on the display screen of the television receiver 22. Therefore, for instance, the area selection unit 44 selects the target user operation area (for instance, the button area C) for which the content is the operation target.

The area selection unit 44 may also select the target user operation area using the start position on the operation surface 42a, the required time until the tap operation, and the state of the users, other than using the start position on the operation surface 42a and the state of the users.

Here, the state of the user is determined by the remote controller 21 on the basis of a captured image obtained from an imaging unit that images the user, for instance. The imaging unit can be configured to be provided in one of the remote controller 21 and the television receiver 22, for instance.

In the first embodiment, the remote controller 21 calculates the start position on the operation surface 42a on the basis of the detection result from the touch pad 42, and selects the target user operation area on the basis of the calculated start position. Then, the remote controller 21 detects the user operation targeting the selected target user operation area.

However, otherwise, for instance, the television receiver 22 may be configured to detect the user operation to the operation surface 42a of the remote controller 21.

In this case, the remote controller 21 transmits the calculated start position and the detection result from the touch pad 42 to the television receiver 22.

In contrast, the television receiver 22 receives the start position and the detection result from the remote controller 21, and selects the target user operation area on the basis of the received start position. Then, the television receiver 22 detects the user operation targeting the selected target user operation area on the basis of the detection result received from the remote controller 21 similarly, and performs the processing according to the detected user operation. That is, the television receiver 22 decides the operation corresponding to the target user operation area on the basis of the detection result received from the remote controller 21, and performs the decided operation (for instance, the operation of moving the pointer 83 or the like). It is similar in the second embodiment as well.

In addition, for instance, when a set-top box is connected to the television receiver 22, instead of the television receiver 22, the set-top box may receive the start position and the detection result from the remote controller 21 and detect the user operation.

Here, the set-top box is a device for converting received broadcast signals to signals that can be reproduced in the television receiver 22.

Also, in the first and second embodiments, the remote controller 21 including the operation surface 42a provided on a part different from the display screen that displays the content has been described. However, the present technology is applicable even to a smartphone or the like including the operation surface 42a that functions also as the display screen which displays the content or the like, for instance. Also, the present technology described in FIG. 1 to FIG. 9 can have the following configuration.

(1)

A detection device that detects a user operation, the detection device including:

an acquisition unit that acquires a start position indicating a position on an operation surface at which contact with the operation surface is started, the operation surface having user operation areas overlapped and arranged thereon, the user operation areas being a target of a user operation and detected according to the user operation, the user operation areas having at least one of an operation content and an operation target of the user operation different therein; and a decision unit that decides an operation corresponding to a user operation area that is the target of the user operation among the plurality of user operation areas which are overlapped and arranged, on the basis of the start position, wherein the operation surface is provided on a part different from a display screen that displays content.

(2)

The detection device according to (1), wherein the acquisition unit acquires the start position on the operation surface at which new contact targeting the operation surface is started in response to a start of the new contact.

(3)

The detection device according to (1) or (2), further including:

a time measurement unit that measures required time needed from an end of the contact with the operation surface to the start of the new contact with the operation surface, wherein the decision unit decides the operation corresponding to the user operation area that is the target of the user operation on the basis of the required time as well.

(4)

The detection device according to (1) or (2), wherein the decision unit decides the operation corresponding to the user operation area that is the target of the user operation on the basis of a state of the content on the display screen as well.

(5)

The detection device according to (4), wherein the decision unit decides the operation corresponding to the target user operation area for which the content is the operation target regardless of the start position while the content is being reproduced, and wherein the decision unit decides the operation corresponding to the user operation area that is the target of the user operation on the basis of the start position while the content is not being reproduced.

(6) The detection device according to (1) or (2), wherein the decision unit decides the operation corresponding to the target user operation area on the basis of presence/absence of visual recognition of the operation surface by a user as well.

(7)

The detection device according to (6), wherein the decision unit decides the operation corresponding to the user operation area that is the target of the user operation on the basis of the start position when the user visually recognizes the operation surface, and wherein the decision unit decides the operation corresponding to the target user operation area defined beforehand regardless of the start position when the user does not visually recognize the operation surface.

(8)

The detection device according to (6) or (7), further including:

a determination unit that determines whether or not the user visually recognizes the operation surface, on the basis of a captured image obtained from an imaging unit that images the user.

(9)

The detection device according to (1) or (2), wherein the decision unit decides the operation corresponding to the target user operation area for which the content is the operation target regardless of the start position in response to the pressing operation for reproducing the content on the display screen.

(10)

The detection device according to (1) to (9), further including:

a detection unit that detects at least one of contact with or pressure on the operation surface, wherein the acquisition unit acquires the start position by calculating the start position on the basis of a detection result of the detection unit.

(11)

The detection device according to (1) to (9), wherein the acquisition unit acquires the start position by receiving the start position transmitted from an operation input device that detects the start position according to the user operation.

(12)

A detection method of a detection device that detects a user operation, the detection method including, by the detection device:

an acquisition step of acquiring a start position indicating a position on an operation surface at which contact with the operation surface is started, the operation surface having user operation areas overlapped and arranged thereon, the user operation areas being a target of a user operation and detected according to the user operation, the user operation areas having at least one of an operation content and an operation target of the user operation different therein; and a decision step of deciding an operation corresponding to a user operation area that is the target of the user operation among the plurality of user operation areas which are overlapped and arranged, on the basis of the start position, wherein the operation surface is provided on a part different from a display screen that displays content.

(13)

A program for causing a computer to function as:

an acquisition unit that acquires a start position indicating a position on an operation surface at which contact with the operation surface is started, the operation surface having user operation areas overlapped and arranged thereon, the user operation areas being a target of a user operation and detected according to the user operation, the user operation areas having at least one of an operation content and an operation target of the user operation different therein; and a decision unit that decides an operation corresponding to a user operation area that is the target of the user operation among the plurality of user operation areas which are overlapped and arranged, on the basis of the start position, wherein the operation surface is provided on a part different from a display screen that displays content.

Figure 11:
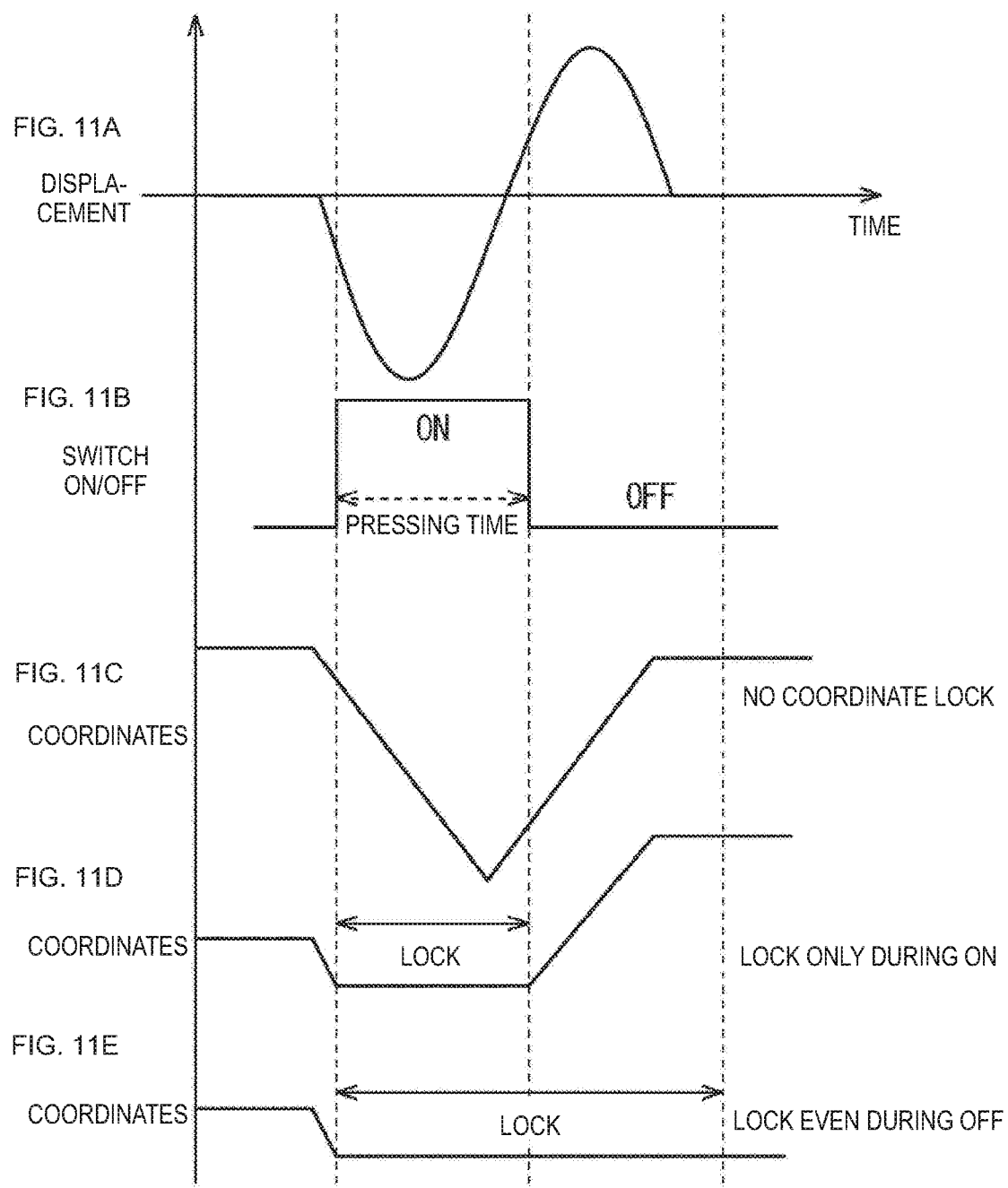
FIGS. 11A, 11B, 11C, 11D, and 11E are diagrams illustrating one example of coordinate change or the like in a pressing operation.
Figure 12:
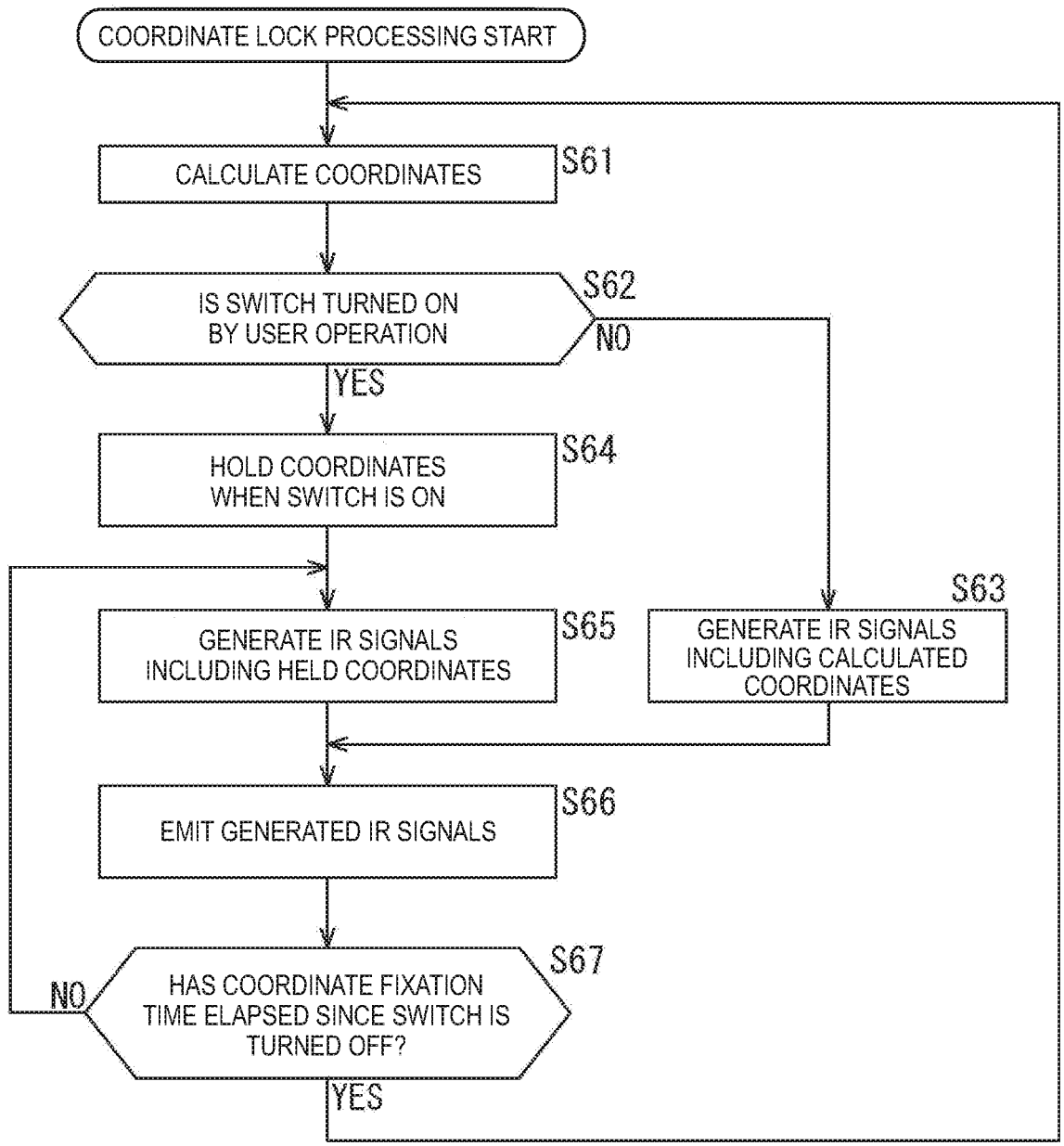
FIG. 12 is a flowchart for illustrating coordinate lock processing performed by the remote controller in FIG. 10.

Also, the present technology described in FIG. 10 to FIG. 12 can have the following configuration.

(1) An information processing device comprising:

an acquisition unit that acquires pressing information indicating presence/absence of pressure on an operation surface to be a target of a user operation of operating an operation target on a display screen; and a control unit that fixes coordinates of the operation target regardless of the user operation targeting the operation surface at least while the pressure on the operation surface is being performed, on the basis of the pressing information.

(2) The information processing device according to the (1), comprising a timing unit that times elapsed time that is elapsed after the time when the pressure on the operation surface is not detected anymore, wherein the control unit further fixes the coordinates of the operation target until the elapsed time exceeds coordinate fixation time indicating the time during which the coordinates of the operation target are fixed after the pressure is not detected anymore.

(3) The information processing device according to the (1) or (2), wherein the control unit fixes the coordinates of the operation target at the coordinates of the time when the pressure on the operation surface is detected.

(4) The information processing device according to the (2), wherein the control unit fixes the coordinates of the operation target until the predetermined coordinate fixation time elapses.

(5) The information processing device according to the (2), wherein the control unit fixes the coordinates of the operation target until the coordinate fixation time calculated on the basis of the pressing time during which the pressure of the user operation is performed elapses.

(6) The information processing device according to the (1) or (2), further comprising a change unit that changes the coordinate fixation time on the basis of history information indicating a history of the pressure performed by the user, wherein the control unit fixes the coordinates of the operation target until the changed coordinate fixation time elapses.

(7) The information processing device according to the (1), wherein the acquisition unit acquires the pressing information by determining presence/absence of pressure on the operation surface.

(8) The information processing device according to the (7), further comprising the operation surface, wherein the acquisition unit acquires the pressing information by determining the presence/absence of the pressure on the operation surface, on the basis of a change in electrostatic capacitance of the operation surface.

(9) The information processing device according to the (1), wherein the acquisition unit performs acquisition by receiving the pressing information transmitted from an operation input device that determines the presence/absence of the pressure on the operation surface.

(10) An information processing method of an information processing device which performs processing according to a user operation, the information processing method comprising:

an acquisition step of acquiring pressing information indicating presence/absence of pressure on an operation surface to be a target of a user operation of operating an operation target on a display screen by the information processing device; and a control step of fixing coordinates of the operation target regardless of the user operation targeting the operation surface at least while the pressure on the operation surface is being performed, on the basis of the pressing information.

(11) A program for making a computer function as:

an acquisition unit that acquires pressing information indicating presence/absence of pressure on an operation surface to be a target of a user operation of operating an operation target on a display screen; and a control unit that fixes coordinates of the operation target regardless of the user operation targeting the operation surface at least while the pressure on the operation surface is being performed, on the basis of the pressing information.

The above-described series of processing can, for example, be executed by hardware, or can be executed by software, for instance. When executing the series of processing by software, a program configuring the software is installed in a computer incorporated in exclusive hardware or a general-purpose computer for instance capable of executing various kinds of functions by installing various kinds of programs, or the like from a medium recording a program.

[Configuration Example of Computer]

Figure 13:
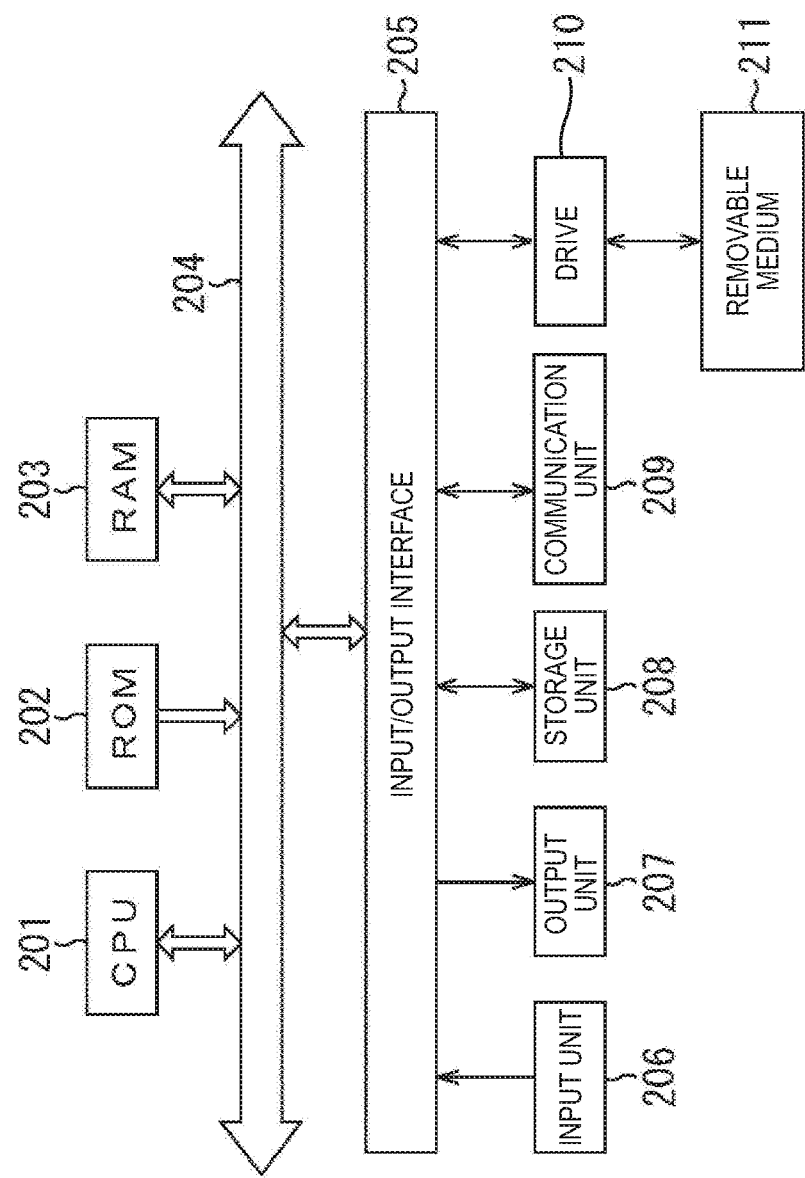
FIG. 13 is a block diagram illustrating a configuration example of hardware of a computer.

FIG. 13 illustrates a configuration example of hardware of the computer that executes the above-described series of processing by the program.

A central processing unit (CPU) 201 executes various kinds of processing according to the programs stored in a read only memory (ROM) 202 or a storage unit 208. A random access memory (RAM) 203 appropriately stores the programs executed by the CPU 201, data, and the like. The CPU 201, the ROM 202, and the RAM 203 are connected to each other through a bus 204.

In addition, an input/output interface 205 is connected to the CPU 201 through the bus 204. An input unit 206 including a keyboard, a mouse, a microphone, and the like, and output unit 207 including a display, a speaker, and the like are connected to the input/output interface 205. The CPU 201 executes the various kinds of processing in accordance with commands inputted from the input unit 206. Then, the CPU 201 outputs processing results to the output unit 207.

The storage unit 208 connected to the input/output interface 205 includes, for example, a hard disk, and stores the programs to be executed by the CPU 201 and various kinds of data. A communication unit 209 communicates with an external apparatus through a network such as the Internet or a local area network.

In addition, the programs may be acquired through the communication unit 209 and stored in the storage unit 208.

When a removable medium 211 such as a magnetic disk, an optical disk, a magnetic-optical disk, or a semiconductor memory is loaded, a drive 210 connected to the input/output interface 205 drives the removable medium 211 and acquires programs, data, and the like stored in the removable medium 211. The acquired programs and data are transferred to the storage unit 208 as necessary, and are stored.

The recording medium that records (stores) the program to be installed in the computer and made executable by the computer includes: the removable medium 211 which is a package medium including a magnetic disk (including a flexible disk), an optical disk (including a compact disc-read only memory (CD-ROM), and a digital versatile disc (DVD)), a magnetic-optical disk (including a mini-disc (MD)), a semiconductor memory, and the like; the ROM 202 that temporarily or permanently stores the programs; the hard disk forming the storage unit 208; and the like, as illustrated in FIG. 13. The program is recorded in the recording medium as necessary through the communication unit 209 which is an interface such as a router or a modem, by utilizing a wired or wireless communication medium such as a local area network, the Internet, or digital satellite broadcast.

In the present disclosure, steps of describing the above series of processing include not only the processing performed in time-series according to the description order but also the processing not always processed in time-series but performed in parallel or individually.

Further, the present disclosure is not limited to the first and second embodiments described above, and various changes and modifications may be made without departing from the scope of the present disclosure

REFERENCE SIGNS LIST 21, 21' remote controller
22 television receiver
41 operation buttons
41a drag button
42 touch pad
42a operation surface
42b switch
$42c_1$, $42c_2$ elastic body
43 processing unit
44 area selection unit
45 time measurement unit
46 IR transmission unit
101 processing unit
101a timing unit
102 coordinate holding unit

The invention claimed is:

1. A detection device that detects user operation, the detection device comprising:
an acquisition unit configured to acquire a start position indicating a position on an operation surface at which a contact with the operation surface is started, wherein
the operation surface includes a plurality of operation areas,
a first operation area of the plurality of operation areas is associated with a first user operation,
a second operation area of the plurality of operation areas corresponds to an area outside the first operation area,
the second operation area is associated with a second user operation, and
the first user operation is different from the second user operation;
a decision unit configured to:
select a target area on the operation surface from the plurality of operation areas based on the start position;
determine the target area corresponds to the first operation area or the second operation area; and
control disablement of one of the first user operation corresponding to the first operation area or the second user operation corresponding to the second operation area based on the determination;
and
a processing unit configured to:
control display of first content on a display screen based on the first user operation in the first operation area; and
control display of second content on the display screen based on the second user operation in the second operation area, wherein the first content is different from the second content.

2. The detection device according to claim 1, wherein the decision unit is further configured to enable the first user operation corresponding to the first operation area based on a determination that the target area corresponds to the first operation area.

3. The detection device according to claim 1, wherein the decision unit is further configured to disable the first user operation corresponding to the first operation area based on a determination that the target area corresponds to the second operation area.

4. The detection device according to claim 1, wherein the decision unit is further configured to disable the first user operation corresponding to the first operation area based on a movement of a user's finger from the second operation area to the first operation area.

5. A detection method to detect a user operation, the detection method comprising:
acquiring a start position indicating a position on an operation surface at which a contact with the operation surface is started, wherein
the operation surface includes a plurality of operation areas,
a first operation area of the plurality of operation areas is associated with a first user operation,
a second operation area of the plurality of operation areas corresponds to an area outside the first operation area,
the second operation area is associated with a second user operation, and
the first user operation is different from the second user operation;
selecting a target area on the operation surface from the plurality of operation areas based on the start position;
determining the target area corresponds to the first operation area or the second operation area;
controlling disablement of one of the first user operation corresponding to the first operation area or the second user operation corresponding to the second operation area based on the determination;
controlling display of first content on a display screen based on the first user operation in the first operation area; and
controlling display of second content on the display screen based on the second user operation in the second operation area, wherein the first content is different from the second content.

6. The detection method according to claim 5, further comprising
enabling the first user operation corresponding to the first operation area based on a determination that the target area corresponds to the first operation area.

7. The detection method according to claim 5, further comprising
disabling the first user operation corresponding to the first operation area based on a determination that the target area corresponds to the second operation area.

8. The detection method according to claim 5, further comprising
disabling the first user operation corresponding to the first operation area based on a movement of a user's finger from the second operation area to the first operation area.

9. A non-transitory computer-readable medium having stored thereon, computer-executable instructions which, when executed by a detection device, cause the detection device to execute operations, the operations comprising:

acquiring a start position indicating a position on an operation surface at which contact with the operation surface is started, wherein
  the operation surface includes a plurality of operation areas,
  a first operation area of the plurality of operation areas is associated with a first user operation,
  a second operation area of the plurality of operation areas corresponds to an area outside the first operation area,
  the second operation area is associated with a second user operation, and
  the first user operation is different from the second user operation;
selecting a target area on the operation surface from the plurality of operation areas based on the start position;
determining the target area corresponds to the first operation area or the second operation area;
controlling disablement of one of the first user operation corresponding to the first operation area or the second user operation corresponding to the second operation area based on the determination;
controlling display of first content on a display screen based on the first user operation in the first operation area; and
controlling display of second content on the display screen based on the second user operation in the second operation area, wherein the first content is different from the second content.

10. The non-transitory computer-readable medium according to claim 9, wherein the operations further comprise
  enabling the first user operation corresponding to the first operation area based on a determination that the target area corresponds to the first operation area.

11. The non-transitory computer-readable medium according to claim 9, wherein the operations further comprise
  disabling the first user operation corresponding to the first operation area based on a determination that the target area corresponds to the second operation area.

12. The non-transitory computer-readable medium according to claim 9, wherein the operations further comprise
  disabling the first user operation corresponding to the first operation area based on a movement of a user's finger from the second operation area to the first operation area.

* * * * *